United States Patent
Kang et al.

(10) Patent No.: US 11,742,919 B2
(45) Date of Patent: *Aug. 29, 2023

(54) METHOD FOR REPORTING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Suckchel Yang, Seoul (KR); Hyungtae Kim, Seoul (KR); Jonghyun Park, Seoul (KR); Kunil Yum, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/581,179

(22) Filed: Jan. 21, 2022

(65) Prior Publication Data

US 2022/0149912 A1 May 12, 2022

Related U.S. Application Data

(63) Continuation of application No. 16/906,742, filed on Jun. 19, 2020, now Pat. No. 11,251,851, which is a
(Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0053* (2013.01); *H04W 48/10* (2013.01); *H04W 72/21* (2023.01); *H04W 72/23* (2023.01)

(58) Field of Classification Search
CPC .. H04B 7/0626; H04B 7/0456; H04B 7/0695; H04B 7/088; H04L 5/0053;
(Continued)

(56) References Cited

U.S. PATENT DOCUMENTS

2011/0249578 A1  10/2011  Nazar et al.
2014/0119313 A1  5/2014  Yang et al.
(Continued)

FOREIGN PATENT DOCUMENTS

CN  104620627  5/2015
EP    3602933  2/2020
(Continued)

OTHER PUBLICATIONS

Notice of Allowance in Chinese Appln. No. 201880041373.X, dated Mar. 15, 2022.
(Continued)

*Primary Examiner* — Will W Lin
(74) *Attorney, Agent, or Firm* — Fish & Richardson P.C.

(57) ABSTRACT

The present disclosure provides a method for reporting CSI in a wireless communication system. In the present disclosure, a method for reporting channel state information (CSI) in a wireless communication system, which is performed by a UE includes: receiving, from an eNB, downlink control information (DCI) indicating activation of semi-persistent (SP) CSI reporting, in which the downlink control information is scrambled with a specific RNTI distinguished from a Cell-Radio Network Temporary Identity (C-RNTI); and reporting, to the eNB, the semi-persistent CSI through a physical uplink shared channel (PUSCH) based on the received downlink control information.

20 Claims, 13 Drawing Sheets

Related U.S. Application Data continuation of application No. 16/665,541, filed on Oct. 28, 2019, now Pat. No. 10,778,312, which is a continuation of application No. PCT/KR2018/004974, filed on Apr. 27, 2018.

(60) Provisional application No. 62/565,185, filed on Sep. 29, 2017, provisional application No. 62/501,080, filed on May 3, 2017, provisional application No. 62/491,322, filed on Apr. 28, 2017.

(51) Int. Cl.
*H04W 48/10* (2009.01)
*H04W 72/21* (2023.01)
*H04W 72/23* (2023.01)

(58) Field of Classification Search
CPC ............ H04L 5/0082; H04L 27/26025; H04L 5/0012; H04L 5/0023; H04L 5/0044; H04L 5/0064; H04L 5/14; H04L 27/261; H04L 27/2614; H04L 5/0057; H04L 5/0091; H04L 1/0026; H04L 1/00; H04W 48/10; H04W 72/0413; H04W 72/042; H04W 72/04; H04W 72/0446
See application file for complete search history.

(56) References Cited

U.S. PATENT DOCUMENTS

| | | | |
|---|---|---|---|
| 2014/0241319 | A1 | 8/2014 | Lee et al. |
| 2014/0314012 | A1 | 10/2014 | Tang |
| 2016/0105882 | A1 | 4/2016 | Park et al. |
| 2016/0135247 | A1 | 5/2016 | Ozturk et al. |
| 2018/0175993 | A1 | 6/2018 | Onggosanusi et al. |
| 2018/0241525 | A1 | 8/2018 | Ouchi et al. |
| 2018/0287757 | A1 | 10/2018 | Onggosanusi |
| 2019/0045484 | A1 | 2/2019 | Liu et al. |
| 2019/0123801 | A1* | 4/2019 | Yum .................... H04W 72/042 |
| 2019/0141677 | A1* | 5/2019 | Harrison ............... H04W 72/04 |

FOREIGN PATENT DOCUMENTS

| | | |
|---|---|---|
| JP | 2013516921 | 5/2013 |
| KR | 101451876 | 10/2014 |
| KR | 101505770 | 3/2015 |
| KR | 20150110525 | 10/2015 |
| KR | 101615988 | 5/2016 |
| WO | WO2016182051 | 11/2016 |

OTHER PUBLICATIONS

Samsung, "Discussions on periodic and semi-persistent CSI reporting for NR," R1-1702944, Presented at 3GPP TSG RAN WG1 Meeting #88, Athens, Greece Feb. 13-17, 2017, 6 pages.
Extended European Search Report in European Appln. No. 18791726.5, dated Oct. 13, 2021, 6 pages.
Fujitsu, CATT, Huawei, LG Electronics, "Corrections to PDSCH mapping," R1-130776, 3GPP TSG RAN WG1 Meeting #72, St Julian's, Malta, dated Jan. 28-Feb. 1, 2016, 3 pages.
Huawei, "Independent and joint control of CSI-RS transmission and CSI reporting for NR MIMO," R1-1701681, 3GPP TSG RAN WG1 Meeting #88, Athens, Greece, Feb. 6, 2017, 9 pages.
Japanese Office Action in Japanese Appln. No. 2019-558483, dated Dec. 1, 2020, 4 pages (with English translation).
JP Office Action in Japanese Appln. No. 2019-558483, dated Jul. 27, 2021, 6 pages (with English translation).
LG Electronics, "Discussion on CSI framework for NR," R1-1702455, 3GPP TSG RAN WG1 Meeting #88, Athens, Greece, dated Feb. 13-17, 2017, 6 pages.
LG Electronics, "Proposal for aperiodic CSI only PUSCH without UL-SCH," R1-160600, 3GPP TSG RAN WG1 Meeting #84, St Julian's, Malta, dated Feb. 15-19, 2016, 6 pages.
LG Electronics, "Remaining details for eMTC," R1-160614, 3GPP TSG RAN WG1 Meeting #84, St Julian's, Malta, dated Feb. 15-19, 2016, 7 pages.
LG Electronics, "Views on CSI acquisition for NR," R1-1609253, 3GPP TSG RAN WG1 Meeting #86b, Lisbon, Portugal, dated Oct. 10-14, 2016, 7 pages.
Nokia et al., "On DCI signaling for aperiodic CSI-RS resource selection," R1-1702293, Presented at 3GPP TSG RAN WG1 Meeting #88, Athens, Greece, Feb. 13-17, 2017, 2 pages.
Nokia, "On the CSI timing relationships," R1-1705992, 3GPP TSG RAN WG1 Meeting #88bis, Spokane, USA, Mar. 24, 2017, 7 pages.
Office Action in Chinese Appln. No. 201880041373.X, dated Oct. 9, 2021, 18 pages (with English translation).
Samsung et al., "WF on CSI Framework for NR," R1-1701292, 3GPP TSG RAN WG1 Meeting NR Ad Hoc, Spokane, USA Jan. 16-20, 2017, Agenda item: 5.1.2.2, 5 pages.
Samsung, "Discussion on CSI-RS Resource Allocation," R1-1705361, 3GPP TSG RAN WG1 Meeting #88bis, Spokane, USA, Mar. 24, 2017, 6 pages.
Sharp, "UCI reporting on PUCCH and PUSCH," R1-1705475, 3GPP TSG RAN WG1 Meeting #88bis, Spokane, USA, Mar. 25, 2017, 5 pages.

* cited by examiner

FIG. 8

| | | PMI Feedback Type | |
|---|---|---|---|
| | | No PMI (OL, TD, single-antenna) | With PMI (CL) |
| PUSCH CQI Feedback type | Wideband (Wideband CQI) | | Mode 1-2: Multiple PMI<br>RI<br>1st wideband CQI (4bit)<br>2nd wideband CQI (4bit) if RI>1<br>Subband PMIs on each subband |
| | UE Selected (subband CQI) | Mode 2-0<br>RI (only for Open-loop SM)<br>Wideband CQI (4bit)+Best-M CQI (2bit)<br>Best-M index<br>when RI>1, CQI of first codeword | Mode 2-2: Multiple PMI<br>RI<br>1st wideband CQI (4bit)+Best-M CQI (2bit)<br>2nd wideband CQI (4bit)+Best-M CQI (2bit) if RI>1<br>Wideband PMI    Best-M PMI<br>Best-M index |
| | Higher layer-configured (subband CQI) | Mode 2-0<br>RI (only for Open-loop SM)<br>Wideband CQI (4bit)+subband CQI (2bit)<br>when RI>1, CQI of first codeword | Mode 3-1: Single PMI<br>RI<br>1st wideband CQI (4bit)+subband CQI (2bit)<br>2nd wideband CQI (4bit)+subband CQI (2bit) if RI>1<br>Wideband PMI |

FIG. 9

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-loop SM) ]<br>One wideband CQI (4bit) ]<br>when RI>1, CQI of first codeword | Mode 1-1<br>RI ]<br>Wideband CQI (4bit)<br>Wideband spatial CQI (3bit) for RI>1<br>Wideband PMI (4bit) ] |
| | UE Selected | Mode 2-0<br>RI (only for Open-loop SM) ]<br>Wideband CQI (4bit) ]<br>Best-1 CQI (4bit) in each BP<br>Best-1 indicator (L-bit label) ]<br>when RI>1, CQI of first codeword | Mode 2-1<br>RI ]<br>Wideband CQI (4bit)<br>Wideband spatial CQI (3bit) for RI>1<br>Wideband PMI (4bit) ]<br>Best-1 CQI (4bit) 1 in each BP<br>Best-1 spatial CQI (3bit) for RI>1<br>Best-1 indicator (L-bit label) ] |

METHOD FOR REPORTING CHANNEL STATE INFORMATION IN WIRELESS COMMUNICATION SYSTEM AND APPARATUS THEREFOR

CROSS-REFERENCE TO RELATED APPLICATIONS

This application is a continuation of U.S. application Ser. No. 16/906,742, filed on Jun. 19, 2020, which is a continuation of U.S. application Ser. No. 16/665,541, filed on Oct. 28, 2019, which is a continuation of International Application No. PCT/KR2018/004974, filed on Apr. 27, 2018, which claims the benefit of U.S. Provisional Application No. 62/491,322, filed on Apr. 28, 2017, U.S. Provisional Application No. 62/501,080, filed on May 3, 2017, and U.S. Provisional Application No. 62/565,185, filed on Sep. 29, 2017, the contents of which are all hereby incorporated by reference herein in their entirety.

The present disclosure relates to a wireless communication system, and more particularly, to a method for reporting channel state information (CSI) and an apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

The present disclosure provides a method for indicating activation or deactivation of semi-persistent (SP) CSI reporting through a PUSCH.

Furthermore, the present disclosure provides a method for reporting semi-persistent (SP) CSI reporting through a PUSCH and/or a PUCCH.

Further, the present disclosure provides a method for solving, when a collision between a PUSCH resource for CSI reporting and a specific uplink resource occurs, solving the collision.

The technical objects of the present disclosure are not limited to the aforementioned technical objects, and other technical objects, which are not mentioned above, will be apparently appreciated by a person having ordinary skill in the art from the following description.

In the present disclosure, a method for reporting channel state information (CSI) in a wireless communication system, which is performed by a UE includes: receiving, from an eNB, downlink control information (DCI) indicating activation of semi-persistent (SP) CSI reporting, in which the downlink control information is scrambled with a specific RNTI distinguished from a Cell-Radio Network Temporary Identity (C-RNTI); and reporting, to the eNB, the semi-persistent CSI through a physical uplink shared channel (PUSCH) based on the received downlink control information.

Further, in the present disclosure, the SP CSI reporting includes first SP CSI reporting and second SP CSI reporting.

Further, in the present disclosure, the method further includes receiving, from the eNB, a PUSCH resource for reporting the SP CSI.

Further, in the present disclosure, when the PUSCH resource collides with a specific uplink resource, the SP CSI is reported to the eNB through a physical uplink control channel (PUCCH).

Further, in the present disclosure, the specific uplink resource is the PUCCH resource or the PUSCH resource on a mini-slot.

Further, in the present disclosure, the SP CSI through the PUCCH is reported in a slot related to the collision.

Further, in the present disclosure, the method further includes determining an uplink resource to perform the SP CSI reporting.

Further, when the DCI is uplink DCI, the SP CSI is reported through the PUSCH.

Further, in the present disclosure, a UE reporting channel state information (CSI) in a wireless communication system includes: a radio frequency (RF) module for transmitting and receiving a radio signal; and a processor functionally connected with the RF module, in which the processor is configured to receive, from an eNB, downlink control information (DCI) indicating activation of semi-persistent (SP) CSI reporting, in which the downlink control information is scrambled with a specific RNTI distinguished from a Cell-Radio Network Temporary Identity (C-RNTI), and report, to the eNB, the semi-persistent CSI through a physical uplink shared channel (PUSCH) based on the received downlink control information.

According to the present disclosure, when an indication for activation or deactivation of SP CSI reporting is performed by DCI, the DCI is scrambled with RNTI apart from C-RNTI or SPS-C-RNTI, thereby reducing power consumption of a terminal.

Furthermore, according to the present disclosure, when a PUSCH resource for the SP CSI reporting and a specific resource having a higher priority than the PUSCH collide with each other, transmission in the specific resource having the high priority is performed, thereby enhancing system performance.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, that are included to provide a further understanding of the invention and are incorporated in and constitute a part of the present specification, illustrate embodiments of the invention and together with the description serve to explain various principles of the invention.

FIG. 8 illustrates an example of a PUSCH CSI reporting mode.

FIG. 9 illustrates an example of a PUCCH CSI reporting mode.

DETAILED DESCRIPTION

Figure 1:
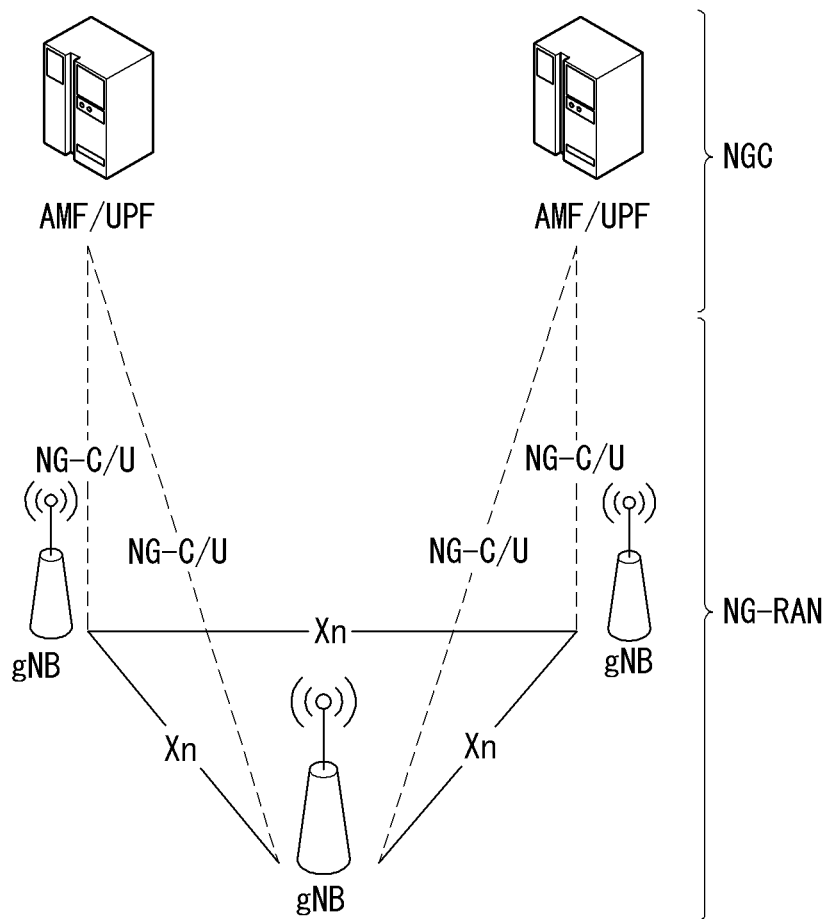
FIG. 1 illustrates an example of an overall structure of a new radio (NR) system to which a method proposed by the present specification is applicable.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and frame structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
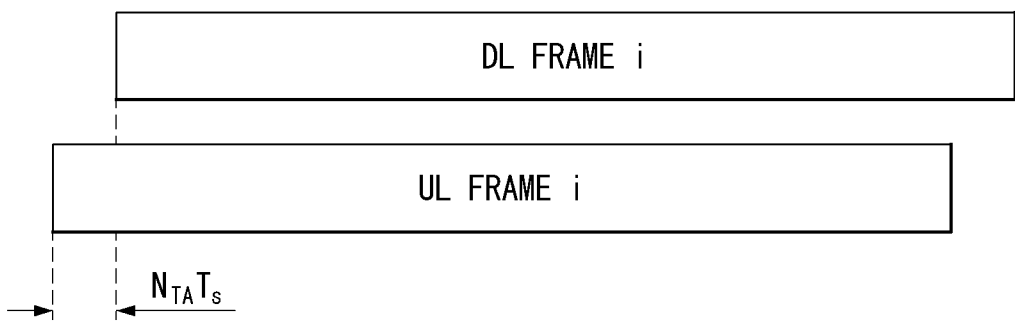
FIG. 2 illustrates a relationship between an uplink frame and a downlink frame in a wireless communication system to which a method proposed by the present specification is applicable.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $N_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | | | Slot configuration | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | | Slot configuration | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
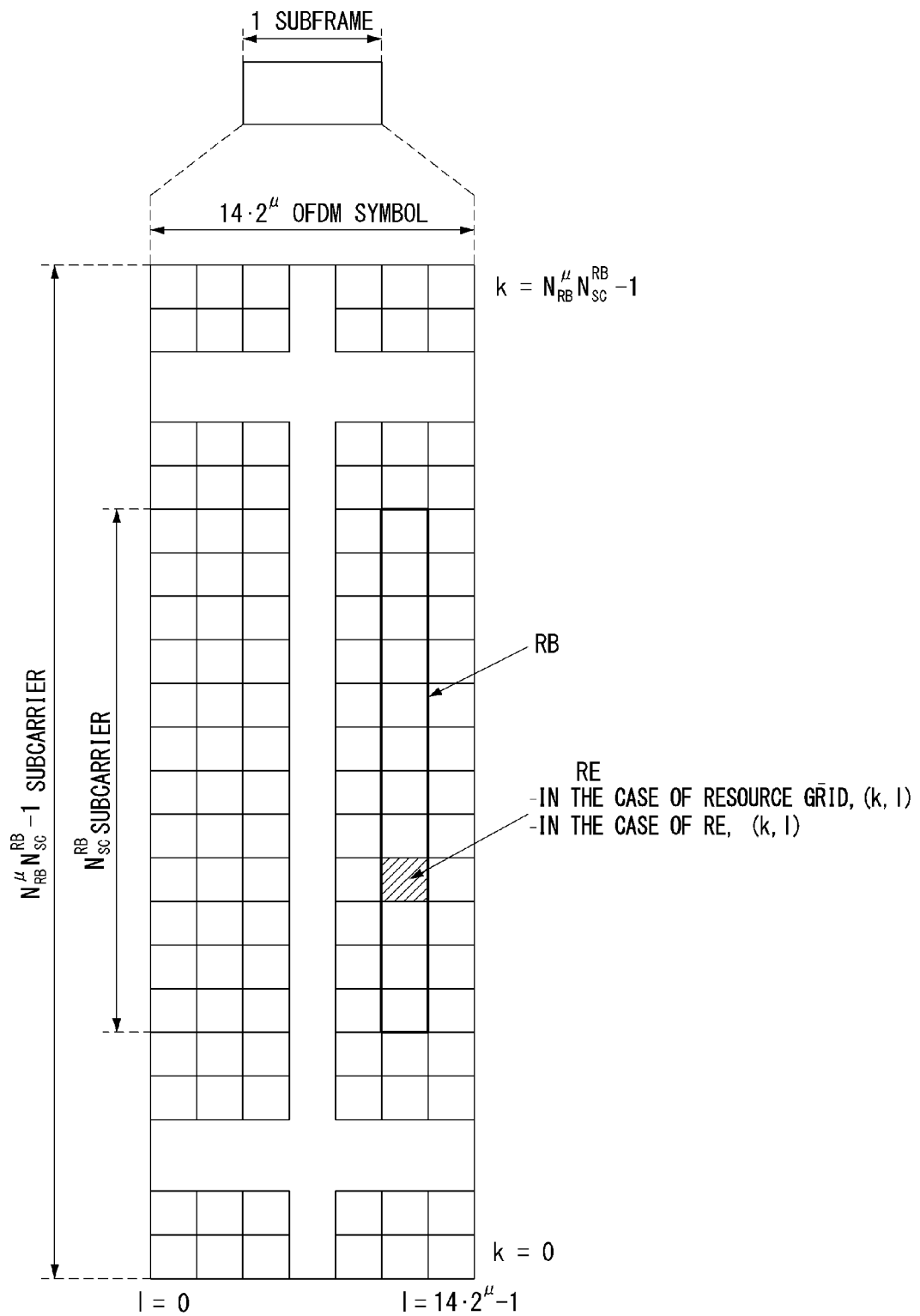
FIG. 3 illustrates an example of a resource grid supported in a wireless communication system to which a method proposed by the present specification is applicable.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Figure 4:
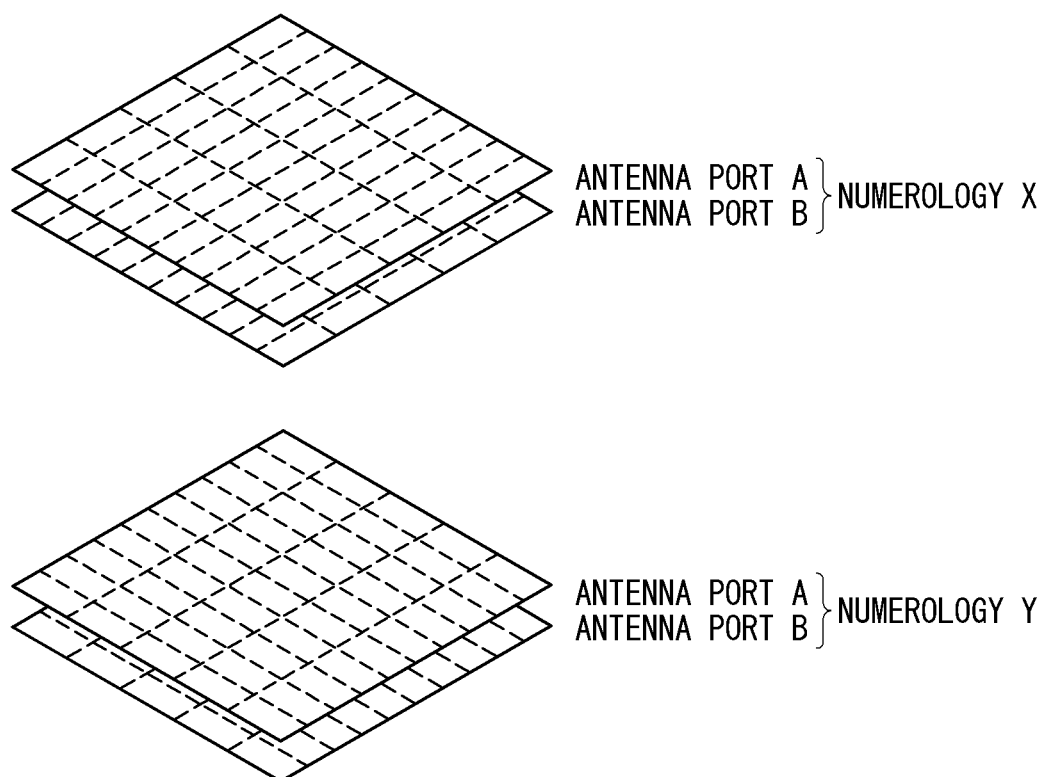
FIG. 4 illustrates examples of a resource grid per antenna port and numerology to which a method proposed by the present specification is applicable.

FIG. 4 illustrates examples of a resource grid per antenna port and numerology to which a method proposed by the present specification is applicable.

Each element of the resource grid for the numerology μ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k, l̄) is used. Herein, $l=0, \ldots, N_{symb}^{\mu}-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \lfloor \overline{N_{sc}^{RB}} \rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Uplink Control Channel

Physical uplink control signaling should be able to carry at least hybrid-ARQ acknowledgements, CSI reports (possibly including beamforming information), and scheduling requests.

At least two transmission methods are supported for an UL control channel supported in an NR system.

The UL control channel can be transmitted in short duration around last transmitted UL symbol(s) of a slot. In this case, the UL control channel is time-division-multiplexed and/or frequency-division-multiplexed with an UL data channel in a slot. For the UL control channel in short duration, transmission over one symbol duration of a slot is supported.

Short uplink control information (UCI) and data are frequency-division-multiplexed both within a UE and between UEs at least for the case where physical resource blocks (PRBs) for short UCI and data do not overlap.

In order to support time division multiplexing (TDM) of a short PUCCH from different UEs in the same slot, a mechanism is supported to inform the UE of whether or not symbol(s) in a slot to transmit the short PUCCH is supported at least above 6 GHz.

At least following is supported for the PUCCH in 1-symbol duration: 1) UCI and a reference signal (RS) are multiplexed in a given OFDM symbol in a frequency division multiplexing (FDM) manner if an RS is multiplexed, and 2) there is the same subcarrier spacing between downlink (DL)/uplink (UL) data and PUCCH in short-duration in the same slot.

At least a PUCCH in short-duration spanning 2-symbol duration of a slot is supported. In this instance, there is the same subcarrier spacing between DL/UL data and the PUCCH in short-duration in the same slot.

At least semi-static configuration, in which a PUCCH resource of a given UE within a slot. i.e., short PUCCHs of different UEs can be time-division multiplexed within a given duration in a slot, is supported.

The PUCCH resource includes a time domain, a frequency domain, and when applicable, a code domain.

The PUCCH in short-duration can span until an end of a slot from UE perspective. In this instance, no explicit gap symbol is necessary after the PUCCH in short-duration.

For a slot (i.e., DL-centric slot) having a short UL part, 'short UCI' and data can be frequency-division multiplexed by one UE if data is scheduled on the short UL part.

The UL control channel can be transmitted in long duration over multiple UL symbols so as to improve coverage. In this case, the UL control channel is frequency-division-multiplexed with the UL data channel within a slot.

UCI carried by a long duration UL control channel at least with a low peak to average power ratio (PAPR) design can be transmitted in one slot or multiple slots.

Transmission across multiple slots is allowed for a total duration (e.g. 1 ms) for at least some cases.

In the case of the long duration UL control channel, the TDM between the RS and the UCI is supported for DFT-S-OFDM.

A long UL part of a slot can be used for transmission of PUCCH in long-duration. That is, the PUCCH in long-duration is supported for both a UL-only slot and a slot having the variable number of symbols comprised of a minimum of 4 symbols.

For at least 1 or 2 UCI bits, the UCI can be repeated within N slots (N>1), and the N slots may be adjacent or may not be adjacent in slots where PUCCH in long-duration is allowed.

Simultaneous transmission of PUSCH and PUCCH for at least the long PUCCH is supported. That is, uplink control on PUCCH resources is transmitted even in the case of the presence of data. In addition to the simultaneous PUCCH-PUSCH transmission, UCI on the PUSCH is supported.

Intra-TTI slot frequency-hopping is supported.
DFT-s-OFDM waveform is supported.
Transmit antenna diversity is supported.

Both the TDM and the FDM between the short duration PUCCH and the long duration PUCCH are supported for different UEs in at least one slot. In a frequency domain, a PRB (or multiple PRBs) is a minimum resource unit size for the UL control channel. If hopping is used, a frequency resource and the hopping may not spread over a carrier bandwidth. Further, a UE-specific RS is used for NR-PUCCH transmission. A set of PUCCH resources is configured by higher layer signaling, and a PUCCH resource within the configured set is indicated by downlink control information (DCI).

As part of the DCI, timing between data reception and hybrid-ARQ acknowledgment transmission should be able to be dynamically indicated (at least in combination with RRC). A combination of the semi-static configuration and (for at least some types of UCI information) dynamic signaling is used to determine the PUCCH resource for both 'long and short PUCCH formats'. Here, the PUCCH resource includes a time domain, a frequency domain, and when applicable, a code domain. The UCI on the PUSCH, i.e., using some of the scheduled resources for the UCI is supported in case of simultaneous transmission of UCI and data.

At least UL transmission of at least single HARQ-ACK bit is supported. A mechanism enabling the frequency diversity is supported. In case of ultra-reliable and low-latency communication (URLLC), a time interval between scheduling request (SR) resources configured for a UE can be less than a slot.

Beam Management

In NR, beam management is defined as follows.

Beam management: a set of L1/L2 procedures to acquire and maintain a set of TRP(s) and/or UE beams that can be used for DL and UL transmission/reception, which includes at least following aspects:

Beam determination: an operation for TRP(s) or UE to select its own transmission/reception beam.

Beam measurement: an operation for TRP(s) or UE to measure characteristics of received beamformed signals.

Beam reporting: an operation for UE to report information of beamformed signal based on beam measurement.

Beam sweeping: an operation of covering a spatial area using transmitted and/or received beams during a time interval in a predetermined way.

Also, the followings are defined as Tx/Rx beam correspondence at the TRP and the UE.

Tx/Rx beam correspondence at TRP holds if at least one of the followings is satisfied.

The TRP is able to determine a TRP reception beam for the uplink reception based on UE's downlink measurement on TRP's one or more transmission beams.

The TRP is able to determine a TRP Tx beam for the downlink transmission based on TRP's uplink measurement on TRP's one or more Rx beams.

Tx/Rx beam correspondence at UE holds if at least one of the followings is satisfied.

The UE is able to determine a UE Tx beam for the uplink transmission based on UE's downlink measurement on UE's one or more Rx beams.

The UE is able to determine a UE reception beam for the downlink reception based on TRP's indication based on uplink measurement on UE's one or more Tx beams.

Capability indication of UE beam correspondence related information to TRP is supported.

The following DL L1/L2 beam management procedures are supported within one or multiple TRPs.

P-1: is used to enable UE measurement on different TRP Tx beams so as to support selection of TRP Tx beams/UE Rx beam(s).

In case of beamforming at the TRP, it generally includes intra/inter-TRP Tx beam sweep from a set of different beams. For beamforming at the UE, it typically includes UE Rx beam sweep from a set of different beams.

P-2: is used to enable UE measurement on different TRP Tx beams to change inter/intra-TRP Tx beam(s).

P-3: is used to enable UE measurement on the same TRP Tx beam to change UE Rx beam in the case where the UE uses beamforming.

At least network triggered aperiodic reporting is supported under P-1, P-2, and P-3 related operations.

The UE measurement based on an RS for the beam management (at least CSI-RS) is composed of K beams (where K is a total number of beams), and the UE reports measurement results of N selected Tx beams, where N is not necessarily fixed number. A procedure based on an RS for mobility purpose is not precluded. Reporting information at least includes measurement quantities for N beam(s) and information indicating N DL transmission beam(s), if N<K. Specifically, for K'>1 non-zero power (NZP) CSI-RS resources of the UE, the UE can report N' CRI (CSI-RS resource indicator).

The UE can be configured with the following higher layer parameters for beam management.

N≥1 reporting settings, M≥1 resource settings

Links between reporting settings and resource settings are configured in the agreed CSI measurement setting.

CSI-RS based P-1 and P-2 are supported with resource and reporting settings.

P-3 can be supported with or without the reporting setting.

A reporting setting including at least the followings

Information indicating selected beam

L1 measurement reporting

Time domain behavior (e.g. aperiodic operation, periodic operation, and semi-persistent operation)

Frequency granularity if several frequency granularities are supported

A resource setting including at least the followings

Time domain behavior (e.g. aperiodic operation, periodic operation, and semi-persistent operation)

RS type: at least NZP CSI-RS

At least one CSI-RS resource set. Each CSI-RS resource set includes K≥1 CSI-RS resources (some parameters of K CSI-RS resources may be the same. For example, port number, time domain behavior, density and periodicity).

Also, NR supports the following beam reporting considering L groups, where L>1.

Information Indicating at Least Group

Measurement quantity for N1 beam (supporting of L1 RSRP and CSI report (when CSI-RS is for CSI acquirement))

Information indicating N1 DL transmission beam, if applicable

The above-described group based beam reporting can be configured per UE basis. The above group based beam reporting can be turned off per UE basis (e.g. when L=1 or N1=1).

NR supports that the UE can trigger a mechanism recovering from a beam failure.

A beam failure event occurs when the quality of beam pair link(s) of an associated control channel is low enough (e.g. comparison with a threshold value, time-out of an associated timer). The mechanism to recover from the beam failure (or beam obstacle) is triggered when the beam failure occurs.

A network explicitly configures to the UE with resources for transmitting UL signals for recovery purpose. Configurations of resources are supported where the base station is listening from all or some directions (e.g. random access region).

The UL transmission/resources to report the beam failure can be located at the same time instance as PRACH (resources orthogonal to PRACH resources) or at a time instance (configurable for the UE) different from the PRACH. The transmission of DL signal is supported for allowing the UE to monitor beams for identifying new potential beams.

NR supports the beam management regardless of a beam-related indication. When the beam-related indication is provided, information pertaining to a UE-side beamforming/receiving procedure used for CSI-RS-based measurement can be indicated to the UE through QCL.

As QCL parameters to support in NR, a spatial parameter for beamforming at a receiver will be added as well as parameters for delay, Doppler, average gain, etc. that have been used in a LTE system. The QCL parameters may include angle-of-arrival related parameters from UE reception beamforming perspective and/or angle-of-departure related parameters from base station reception beamforming perspective.

NR supports using the same beam or different beams on control channel and corresponding data channel transmissions.

For NR-PDCCH (physical downlink control channel) transmission supporting robustness against beam pair link blocking, the UE can be configured to monitor NR-PDCCH on M beam pair links simultaneously, where M≥1 and a maximum value of M may depend on at least UE capability.

The UE can be configured to monitor NR-PDCCH on different beam pair link(s) in different NR-PDCCH OFDM symbols. Parameters related to UE Rx beam setting for monitoring NR-PDCCH on multiple beam pair links are configured by higher layer signaling or MAC CE and/or considered in a search space design.

At least, NR supports an indication of spatial QCL assumption between DL RS antenna port(s) and DL RS antenna port(s) for demodulation of DL control channel. Candidate signaling methods for beam indication for a NR-PDCCH (i.e. configuration method to monitor NR-PDCCH) are MAC CE signaling, RRC signaling, DCI signaling, specification-transparent and/or implicit method, and combination of these signaling methods.

For reception of unicast DL data channel, NR supports an indication of spatial QCL assumption between a DL RS antenna port and a DMRS antenna port of DL data channel.

Information indicating an RS antenna port is indicated via DCI (downlink grant). The information indicates the RS antenna port which is QCL-ed with the DMRS antenna port. A different set of DMRS antenna ports for the DL data channel can be indicated as QCL with a different set of RS antenna ports.

Hybrid Beamforming

Existing beamforming technology using multiple antennas may be classified into an analog beamforming scheme and a digital beamforming scheme according to a location to which beamforming weight vector/precoding vector is applied.

The analog beamforming scheme is a beamforming technique applied to an initial multi-antenna structure. The analog beamforming scheme may mean a beamforming technique which branches analog signals subjected to digital signal processing into multiple paths and then applies phase-shift (PS) and power-amplifier (PA) configurations for each path.

For analog beamforming, a structure in which an analog signal derived from a single digital signal is processed by the PA and the PS connected to each antenna is required. In other words, in an analog stage, a complex weight is processed by the PA and the PS.

Figure 5:
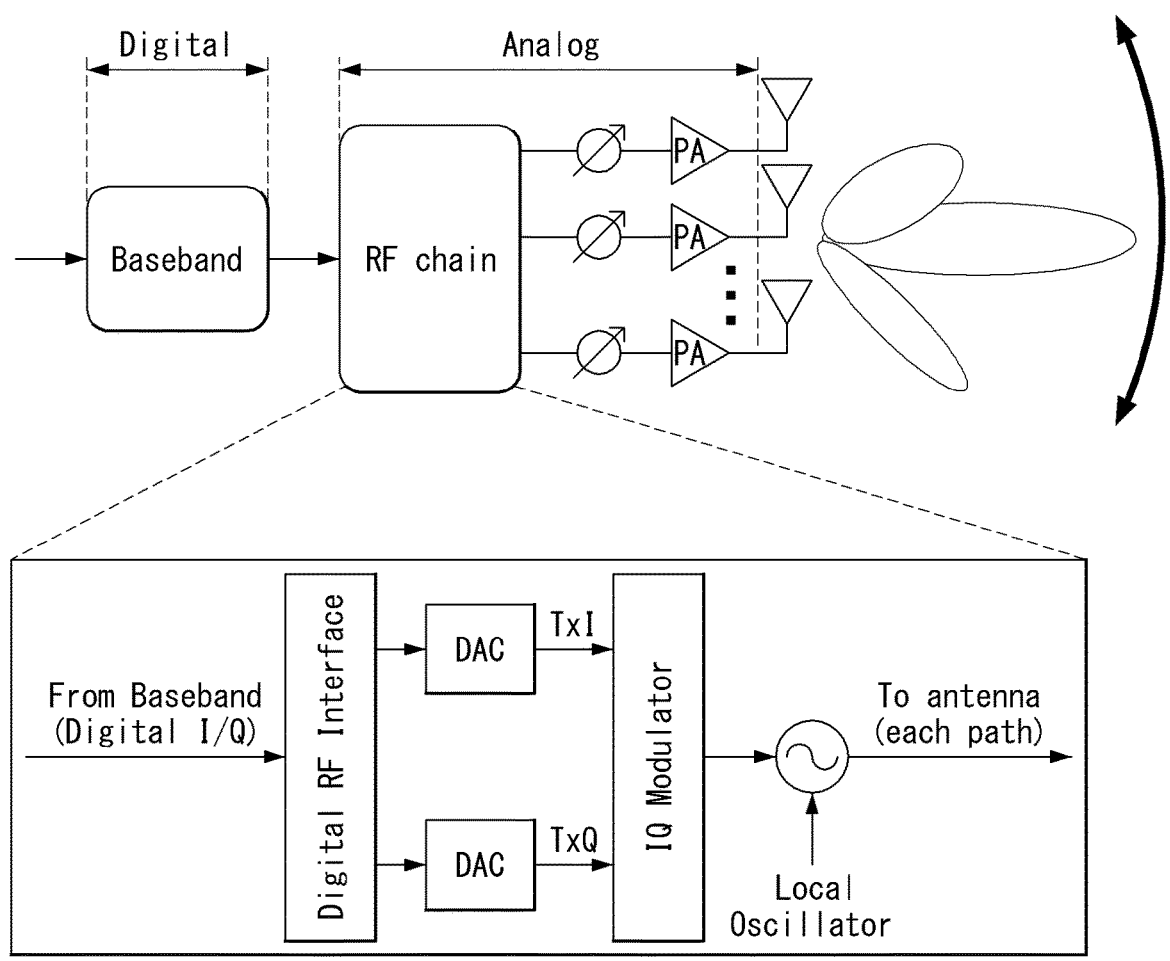
FIG. 5 illustrates an example of a block diagram of a transmitter composed of an analog beamformer and an RF chain.

FIG. 5 illustrates an example of a block diagram of a transmitter composed of an analog beamformer and an RF chain. FIG. 5 is merely for convenience of explanation and does not limit the scope of the present disclosure.

In FIG. 5, the RF chain means a processing block for converting a baseband (BB) signal into an analog signal. The analog beamforming scheme determines beam accuracy according to characteristics of elements of the PA and PS and may be suitable for narrowband transmission due to control characteristics of the elements.

Further, since the analog beamforming scheme is configured with a hardware structure in which it is difficult to implement multi-stream transmission, a multiplexing gain for transfer rate enhancement is relatively small. In addition, in this case, beamforming per UE based on orthogonal resource allocation may not be easy.

On the contrary, in the case of digital beamforming scheme, beamforming is performed in a digital stage using a baseband (BB) process in order to maximize diversity and multiplexing gain in a MIMO environment.

Figure 6:
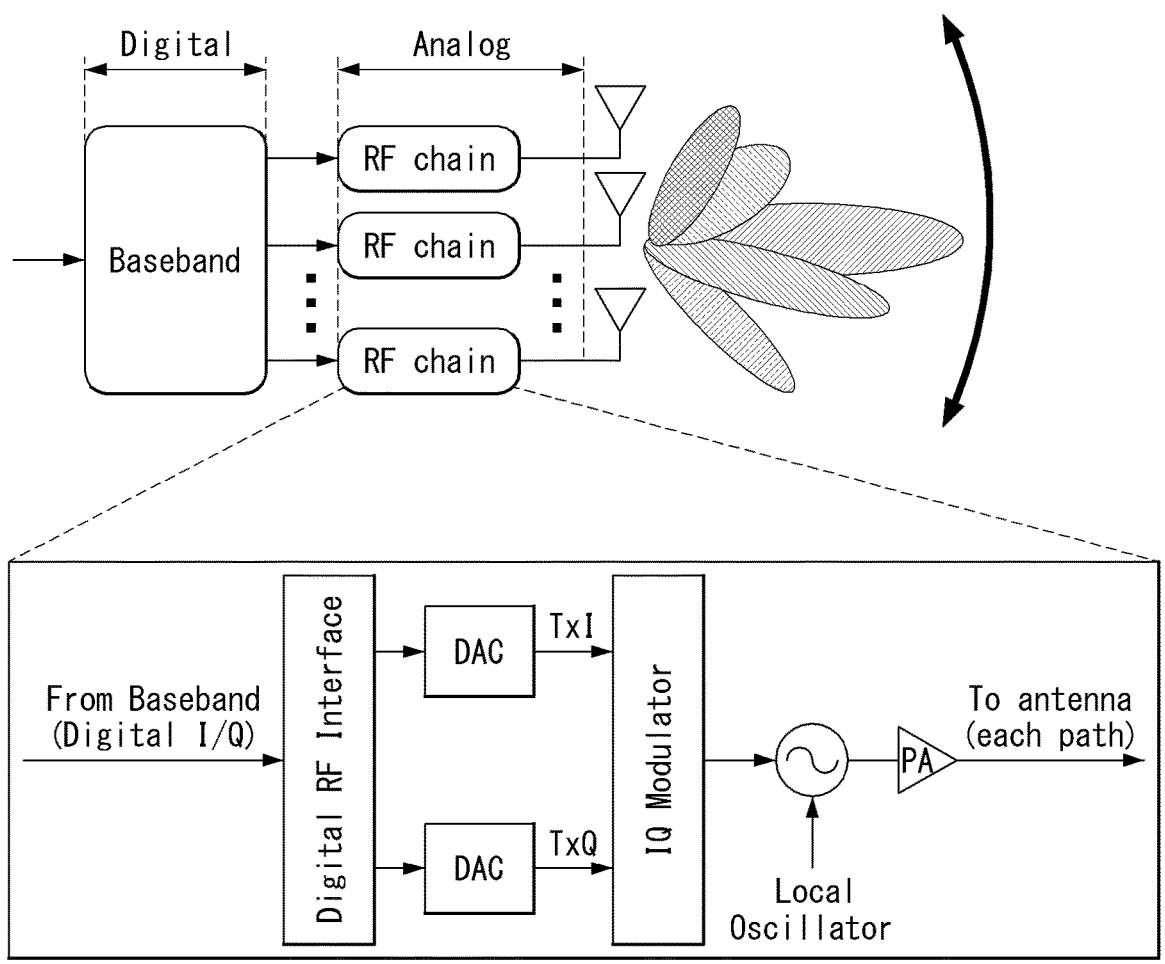
FIG. 6 illustrates an example of a block diagram of a transmitter composed of a digital beamformer and an RF chain.

FIG. 6 illustrates an example of a block diagram of a transmitter composed of a digital beamformer and an RF chain. FIG. 6 is merely for convenience of explanation and does not limit the scope of the present disclosure.

In FIG. 6, beamforming can be performed as precoding is performed in the BB process. Here, the RF chain includes a PA. This is because a complex weight derived for beamforming is directly applied to transmission data in the case of digital beamforming scheme.

Furthermore, since different beamforming can be performed per UE, it is possible to simultaneously support multi-user beamforming. Besides, since independent beamforming can be performed per UE to which orthogonal resources are assigned, scheduling flexibility can be improved and thus a transmitter operation suitable for the system purpose can be performed. In addition, if a technology such as MIMO-OFDM is applied in an environment supporting wideband transmission, independent beamforming can be performed per subcarrier.

Accordingly, the digital beamforming scheme can maximize a maximum transfer rate of a single UE (or user) based on system capacity enhancement and enhanced beam gain. On the basis of the above-described properties, digital beamforming based MIMO scheme has been introduced to existing 3G/4G (e.g. LTE(-A)) system.

In the NR system, a massive MIMO environment in which the number of transmit/receive antennas greatly increases may be considered. In cellular communication, a maximum number of transmit/receive antennas applied to an MIMO environment is assumed to be 8. However, as the massive MIMO environment is considered, the number of transmit/receive antennas may increase to above tens or hundreds.

If the aforementioned digital beamforming scheme is applied in the massive MIMO environment, a transmitter needs to perform signal processing on hundreds of antennas through a BB process for digital signal processing. Hence, signal processing complexity may significantly increase, and complexity of hardware implementation may remarkably increase because as many RF chains as the number of antennas are required.

Furthermore, the transmitter needs to perform independent channel estimation for all the antennas. In addition, in case of an FDD system, since the transmitter requires feedback information about a massive MIMO channel composed of all antennas, pilot and/or feedback overhead may considerably increase.

On the other hand, when the aforementioned analog beamforming scheme is applied in the massive MIMO environment, hardware complexity of the transmitter is relatively low.

However, an increase degree of a performance using multiple antennas is very low, and flexibility of resource allocation may decrease. In particular, it is difficult to control beams per frequency in the wideband transmission.

Accordingly, instead of exclusively selecting only one of the analog beamforming scheme and the digital beamforming scheme in the massive MIMO environment, there is a need for a hybrid transmitter configuration scheme in which an analog beamforming structure and a digital beamforming structure are combined.

Analog Beam Scanning

In general, analog beamforming may be used in a pure analog beamforming transmitter/receiver and a hybrid beamforming transmitter/receiver. In this instance, analog beam scanning can perform estimation for one beam at the same time. Thus, a beam training time required for the beam scanning is proportional to the total number of candidate beams.

As described above, the analog beamforming necessarily requires a beam scanning process in a time domain for beam estimation of the transmitter/receiver. In this instance, an estimation time $T_s$ for all of transmit and receive beams may be represented by the following Equation 2.

$$T_S = t_s \times (K_T \times K_R) \quad \text{[Equation 2]}$$

In Equation 2, is denotes time required to scan one beam, $K_T$ denotes the number of transmit beams, and $K_R$ denotes the number of receive beams.

Figure 7:
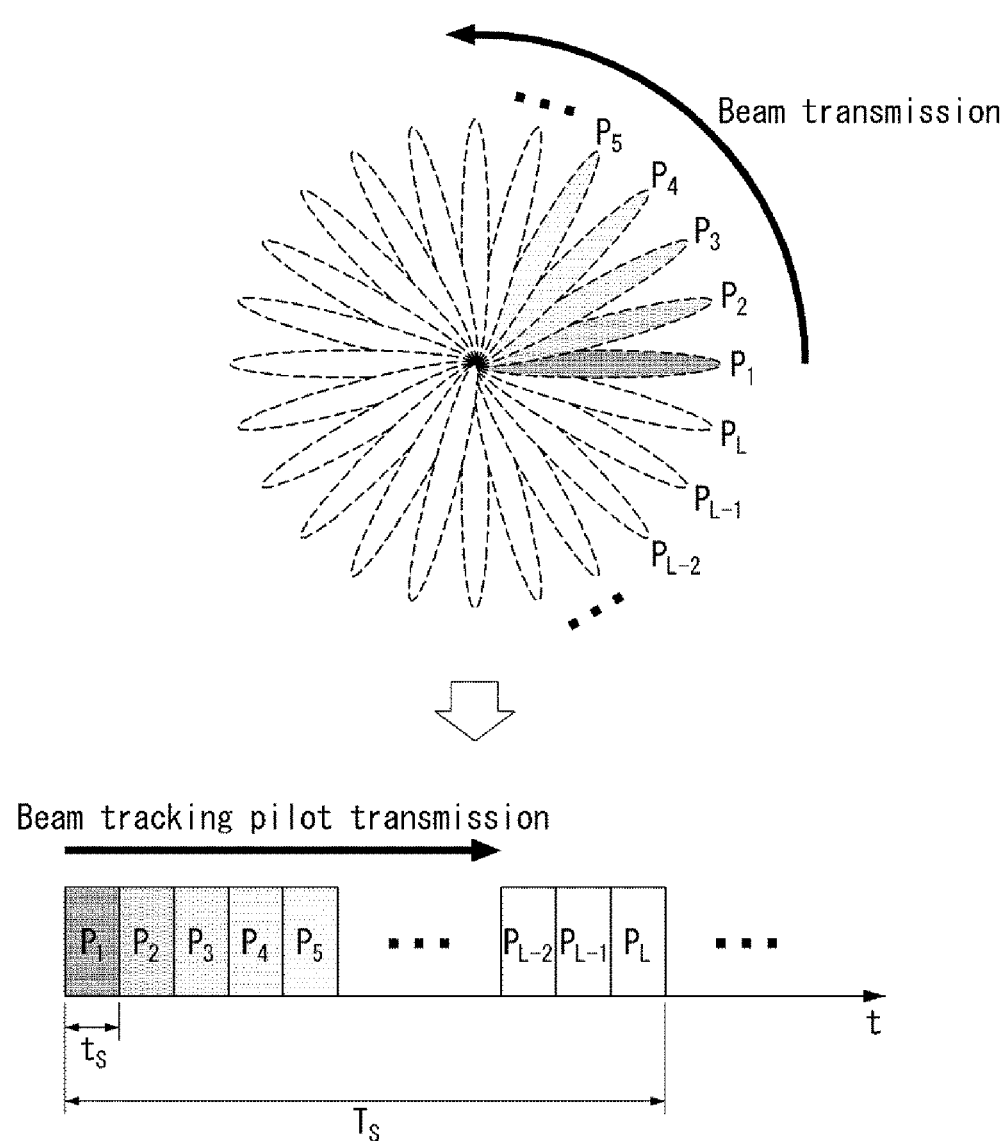
FIG. 7 illustrates an example of an analog beam scanning scheme according to various embodiments of the present disclosure.

FIG. 7 illustrates an example of an analog beam scanning scheme according to various embodiments of the present disclosure. FIG. 7 is merely for convenience of explanation and does not limit the scope of the present disclosure.

In FIG. 7, it is assumed that the total number $K_T$ of transmit beams is L, and the total number $K_R$ of receive beams is 1. In this case, since the total number of candidate beams is L, L time intervals are required in the time domain.

In other words, since only the estimation of one beam can be performed in a single time interval for analog beam estimation, L time intervals are required to estimate all of L beams P1 to PL as shown in FIG. 7. The UE feeds back, to the base station, an identifier (ID) of a beam with a highest signal strength after an analog beam estimation procedure is ended. Namely, as the number of individual beams increases according to an increase in the number of transmit/receive antennas, a longer training time may be required.

Because the analog beamforming changes a magnitude and a phase angle of a continuous waveform of the time domain after a digital-to-analog converter (DAC), a training interval for an individual beam needs to be secured for the analog beamforming, unlike the digital beamforming. Thus, as a length of the training interval increases, efficiency of the system may decrease (i.e., a loss of the system may increase).

Channel State Information (CSI) Feedback

In most cellular systems including the LTE system, a UE receives a pilot signal (reference signal) for channel estimation from a base station, calculates channel state information (CSI), and reports the calculated CSI to the base station.

The base station transmits a data signal based on the CSI fed back from the UE.

In the LTE system, the CSI fed back by the UE includes channel quality information (CQI), a precoding matrix index (PMI), and a rank indicator (RI).

CQI feedback is radio channel quality information provided to the base station for the purpose (link adaptation purpose) of providing a guide as to which modulation and coding scheme (MCS) the base station applies when transmitting data.

If radio quality between the base station and the UE is high, the UE may feedback a high CQI value to the base station, and the base station may transmit data using a relatively high modulation order and a low channel coding rate. On the contrary, if radio quality between the base station and the UE is low, the UE may feedback a low CQI value to the base station, and the base station may transmit data using a relatively low modulation order and a high channel coding rate.

PMI feedback is preferred precoding matrix information provided to the base station for the purpose of providing a guide as to which MIMO precoding scheme the base station applies when installing multiple antennas.

The UE estimates a downlink MIMO channel between the base station and the UE from the pilot signal and recommends which MIMO precoding scheme is applied to the base station through the PMI feedback.

In the LTE system, only linear MIMO precoding that is representable in the form of a matrix is considered in PMI configuration.

The base station and the UE share a codebook composed of multiple precoding matrices, and each MIMO precoding matrix within the codebook has a unique index.

Accordingly, the UE feeds back an index corresponding to a most preferred MIMO precoding matrix within the codebook as a PMI to thereby minimize an amount of feedback information of the UE.

A PMI value needs not be necessarily configured as one index. For example, in the LTE system, when the number of transmit antenna ports is 8, a final 8tx MIMO precoding matrix may be derived by combining two indices (i.e., a first PMI and a second PMI).

RI feedback is information about the number of preferred transmission layers provided to the base station for the purpose of providing a guide to the number of transmission layers preferred by the UE when the UE and the base station enable multi-layer transmission through spatial multiplexing by installing multiple antennas.

The RI has a very close relationship with the PMI. This is because the base station needs to know which precoding will be applied to each layer according to the number of transmission layers.

In PMI/RI feedback configuration, a method of configuring a PMI codebook on the basis of single layer transmission, defining a PMI per layer and feeding back the PMI may be considered. However, the method has a disadvantage in that an amount of PMI/RI feedback information greatly increases due to an increase in the number of transmission layers.

Accordingly, in the LTE system, a PMI codebook has been defined per number of transmission layers. That is, N Nt×R matrices are defined in a codebook for R-layer transmission, where R is the number of layers, Nt is the number of transmit antenna ports, and N is the size of the codebook.

Accordingly, in the LTE system, the size of a PMI codebook is defined irrespective of the number of transmission layers. Since the number R of transmission layers is eventually equal to a rank value of a precoding matrix (Nt×R matrix) as the PMI/RI is defined with such a structure, a term of rank indicator (RI) has been used.

The PMI/RI described in the present specification is not limited to mean an index value and a rank value of a precoding matrix represented as Nt×R matrix, like PMI/RI in the LTE system.

The PMI described in the present specification indicates information of a preferred MIMO precoder among MIMO precoders applicable to a transmitter, and a form of the precoder is not limited to only a linear precoder that can be represented as a matrix as in the LTE system. Further, the RI described in the present specification is interpreted in a broader sense than RI in LTE and includes all of feedback information indicating the number of preferred transmission layers.

The CSI may be obtained in all of system frequency domains and may be also obtained in some frequency domains. In particular, it may be useful for a wideband system to obtain CSI for some preferred frequency domains (e.g. subband) per UE and feedback the CSI.

In the LTE system, CSI feedback is performed on an uplink channel. In general, periodic CSI feedback is performed on a physical uplink control channel (PUCCH), and aperiodic CSI feedback is performed on a physical uplink shared channel (PUSCH) which is an uplink data channel.

The aperiodic CSI feedback is temporarily performed only when the base station desires CSI feedback information, and the base station triggers the CSI feedback on a downlink control channel such as PDCCH/ePDCCH.

When the CSI feedback has been triggered in the LTE system, which information the UE should feedback is classified into PUSCH CSI reporting modes as shown in FIG. 8. The UE is previously informed of which PUSCH CSI reporting mode the UE should operate in through a higher layer message.

FIG. 8 illustrates an example of a PUSCH CSI reporting mode.

The PUCCH CSI reporting mode is also defined for the periodic CSI feedback on the PUCCH.

FIG. 9 illustrates an example of a PUCCH CSI reporting mode.

In the case of PUCCH, since an amount (i.e., a payload size) of data which can be transmitted at once is less than that in the PUSCH, it is difficult to transmit CSI, that needs to be transmitted, at once.

Accordingly, a time at which CQI and PMI are transmitted and a time at which RI is transmitted are different from each other according to each CSI reporting mode. For example, in reporting mode 1-0, only RI is transmitted at a specific PUCCH transmission time, and wideband CQI is transmitted at another PUCCH transmission time. A PUCCH reporting type is defined according to kinds of CSI configured at the specific PUCCH transmission time. For example, a reporting type of transmitting only the RI corresponds to type 3, and a reporting type of transmitting only the wideband CQI corresponds to type 4. A feedback periodicity and an offset value of the RI and a feedback periodicity and an offset value of CQI/PMI are configured to the UE through higher layer message.

The above CSI feedback information is included in uplink control information (UCI).

Reference Signals in LTE

In the LTE system, the purpose of a pilot signal or a reference signal (RS) may be roughly divided as follows.

Measurement RS: pilot for channel state measurement

CSI measurement/reporting purpose (short term measurement): purpose of link adaptation, rank adaptation, closed loop MIMO precoding, etc.

Long term measurement/reporting purpose: purpose of handover, cell selection/reselection, etc.

Demodulation RS: pilot for physical channel reception

Positioning RS: pilot for UE location estimation

MBSFN RS: pilot for multi-cast/broadcast service

In LTE Rel-8, a cell-specific RS (CRS) has been used for measurement (purpose 1 AB) and demodulation (purpose 2) for most of downlink physical channels. However, in order to solve RS overhead problem due to an increase in the number of antennas, from LTE Advanced (Rel-10), a CSI-RS is used dedicatedly for CSI measurement (purpose 1A), and a UE-specific RS is used dedicatedly for the reception (purpose 2) of downlink data channel (PDSCH).

The CSI-RS is an RS designed dedicatedly for the CSI measurement and feedback and is characterized by having an RS overhead much lower than the CRS. The CRS supports up to 4 antenna ports, whereas the CSI-RS is designed to support up to 8 antenna ports. The UE-specific RS is designed dedicatedly for demodulation of a data channel and, unlike the CRS, is characterized in that it is an RS (precoded RS) in which a MIMO precoding scheme applied when data is transmitted to the corresponding UE is equally applied to a pilot signal.

Accordingly, as many UE-specific RSs as the number of antenna ports do not need to be transmitted as in the CRS and the CSI-RS, and as many UE-specific RSs as the number of transmission layers (i.e., transmission ranks) are transmitted.

Further, since the UE-specific RS is transmitted for the data channel reception purpose of the corresponding UE in the same resource region as a data channel resource region allocated to each UE through a scheduler of the base station, it is characterized to be UE-specific.

In addition, since the CRS is always transmitted in the same pattern within a system bandwidth so that all of UEs within the cell can use the CRS for the purposes of measurement and demodulation, it is cell-specific.

In LTE uplink, a sounding RS (SRS) has been designed as a measurement RS, and a demodulation RS (DMRS) for an uplink data channel (PUSCH) and a DMRS for an uplink control channel (PUCCH) for ACK/NACK and CSI feedback have been individually designed.

Self-Contained Subframe Structure

A time division duplexing (TDD) structure considered in the NR system is a structure in which both uplink (UL) and downlink (DL) are processed in one subframe. The structure is to minimize a latency of data transmission in a TDD system and is referred to as a self-contained subframe structure.

Figure 10:
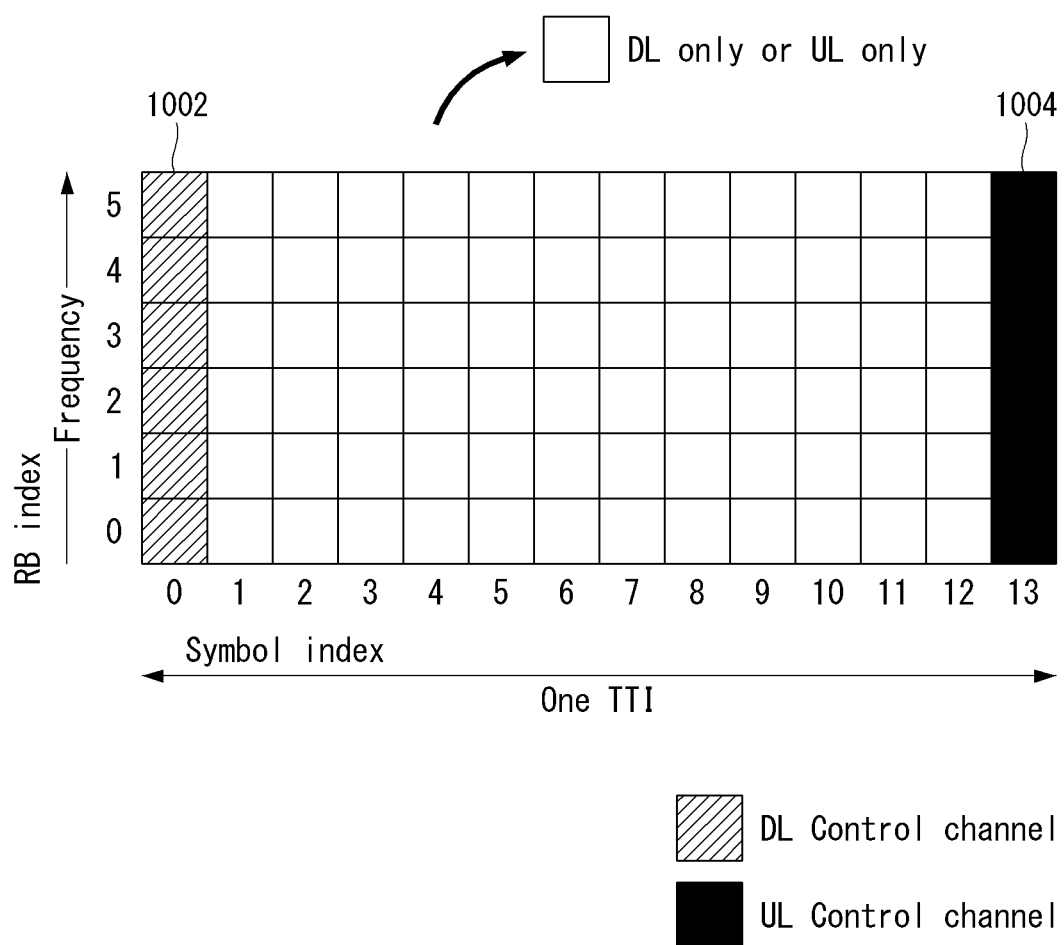
FIG. 10 illustrates an example of a self-contained subframe structure to which a method proposed by the present specification is applicable.

FIG. 10 illustrates an example of a self-contained subframe structure to which a method proposed by the present specification is applicable. FIG. 10 is merely for convenience of explanation and does not limit the scope of the present disclosure.

Referring to FIG. 10, as in legacy LTE, it is assumed that one subframe is composed of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

Namely, uplink control information and downlink control information are transmitted in one self-contained subframe. On the other hand, in case of data, uplink data or downlink data is transmitted in one self-contained subframe.

When the structure shown in FIG. 10 is used, downlink transmission and uplink transmission are sequentially performed in one self-contained subframe, and downlink data transmission and uplink ACK/NACK reception can be performed.

As a result, if an error occurs in the data transmission, time required until retransmission of data can be reduced. Hence, the latency related to data transfer can be minimized.

In the self-contained subframe structure shown in FIG. 10, a base station (e.g. eNodeB, eNB, gNB) and/or a user equipment (UE) (e.g. terminal) require a time gap for a process for converting a transmission mode into a reception mode or a process for converting a reception mode into a transmission mode. Regarding the time gap, when uplink transmission is performed after downlink transmission in the self-contained subframe, some OFDM symbol(s) may be configured as a guard period (GP).

3GPP NR will support the following three time-domain behaviors related to CSI reporting. Similarly, reporting for (analog) beam management can also support some or all of the following three time-domain behaviors.

Aperiodic CSI Reporting

CSI reporting is performed only in triggering

Semi-persistent CSI Reporting

If activation, CSI reporting starts (on specific periodicity), and if deactivation, the CSI reporting is discontinued.

Periodic CSI Reporting

Periodic CSI reporting performs CSI reporting with RRC configured periodicity and slot offset.

A downlink reference signal (DL RS) for channel measurement in CSI acquisition will also support the following three time-domain behaviors. Similarly, a DL RS for beam management can also support some or all of the following three time-domain behaviors.

The DL RS for beam management will basically include a CSI-RS, and other downlink signals may be utilized.

Examples of the other downlink signals may use a mobility RS, a beam RS, a synchronization signal (SS), and a SS block, DL DMRSs (e.g. PBCH DMRS, PDCCH DMRS).

Aperiodic CSI-RS

CSI-RS measurement is performed only in triggering

Semi-Persistent CSI-RS

If activation, CSI-RS measurement starts (on specific periodicity), and if deactivation, the CSI-RS measurement is discontinued.

Periodic CSI-RS

Periodic CSI-RS performs CSI-RS measurement with RRC configured periodicity and slot offset.

Further, in CSI acquisition, a zero-power (ZP) CSI-RS based interference measurement method which has been utilized in LTE will be supported to an interference measurement resource (IMR) which is designated to the UE by the base station. In addition, at least one of a non-zero-power (NZP) CSI-RS based interference measurement method or a DMRS based interference measurement method will be supported.

In particular, in the LTE system, ZP CSI-RS based IMR has been configured as semi-static (via RRC signaling), whereas a dynamically configured method will be supported in NR. Also, the following three time-domain behaviors will be supported.

Aperiodic IMR with ZP CSI-RS

Semi-persistent IMR with ZP CSI-RS

Periodic IMR with ZP CSI-RS

Accordingly, channel estimation, interference estimation, and reporting configuring CSI measurement and reporting may use combinations of the following various time domain behaviors.

Hereinafter, aperiodic is simply represented as AP, semi-persistent is simply represented as SP, and periodic is simply represented as PR for convenience of explanation.

Example 1) AP CSI reporting with AP/SP/PR NZP CSI-RS for channel measurement and AP/SP/PR ZP CSI-RS for interference estimation.

Example 2) SP CSI reporting with AP/SP/PR NZP CSI-RS for channel measurement and AP/SP/PR ZP CSI-RS for interference estimation.

Example 3) PR CSI reporting with PR NZP CSI-RS for channel measurement and PR ZP CSI-RS for interference estimation.

In the above examples, it is assumed that AP RS/IMR is used only in AP reporting, SP RS/IMR is used only in AP reporting or SP reporting, and PR RS/IMR is used in all reportings. However, they are not limited thereto.

Further, both RS and IMR may be included in resource setting, and their purpose, i.e., channel estimation or interference estimation may be indicated through configuration for each link in measurement setting.

In New Rat (NR), as the PUCCH, a short PUCCH and a long PUCCH are considered.

The short PUCCH may be transmitted by using one or two OFDM symbols as the time domain and transmitted by using one or more physical resource blocks (PRBs) as the frequency domain.

Table 4 below is a table showing one example of the PUCCH format defined in the

TABLE 4

| PUCCH format | Length in OFDM symbols |
|---|---|
| 0 | 1-2 |
| 1 | 4-14 |
| 2 | 1-2 |
| 3 | 4-14 |
| 4 | 4-14 |

In Table 4, PUCCH formats 0 and 2 may be the short PUCCH and PUCCH formats 1, 3, and 4 may be the long PUCCH. Next, the long PUCCH may be transmitted by using 4 to 12 OFDM symbols in the time domain and transmitted by using one or more physical resource blocks (PRBs) in the frequency domain.

The short PUCCH may be primarily used for the purpose of feedback of fast acknowledge (ACK) or non-acknowledge (NACK) for downlink (DL) data in the self-contained slot structure.

In addition, the long PUCCH may be used for the purpose of feedback of the ACK/NACK and the CSI by occupying a predetermined resource for each UE similarly to the PUCCH of the LTE.

The minimum number of symbols of the long PUCCH is 4.

The reason is that various slot structures or slot formats in the NR are considered.

The slot defined in the NR will be simply described.

For subcarrier spacing configuration μ, slots are numbered with an order in which the subcarrier spacing configuration μ increases, i.e., $n_s^\mu \in \{0, \ldots, N_{slot}^{subframe, \mu} -1\}$ and numbered with an order in which the subcarrier spacing configuration μ increases, i.e., $n_s^\mu \in \{0, \ldots, N_{slot}^{subframe, \mu} -1\}$ in one (radio) frame.

For $N_{symb}^{slot}$, there are contiguous OFDM symbols $N_{symb}^{slot}$ in a slot which depends on the cyclic prefix.

The start of a slot $n_s^\mu$ in the subframe and the start of an OFDM symbol $n_s^\mu N_{symb}^{slot}$ in the same subframe are aligned with each other in the time.

In the slot, the OFDM symbols may be classified into 'downlink(D)', 'flexible(X)', or 'uplink(U)'.

In a downlink slot, the UE may assume that the downlink transmission occurs only in 'downlink' or in the 'flexible' symbol.

In an uplink slot, the UE may assume that the uplink transmission occurs only in 'uplink' or in the 'flexible' symbols.

For reference, in the NR, the number of OFDM symbols included in one slot may be 14 or 7.

Further, the slot structure may include various structures including a DL dominant structure (e.g., the PDCCH, the PDSCH, and the short PUCCH coexist in the slot), a UL dominant structure (e.g., the PUCCH and the PUSCH coexist in the slot), and the like in addition to the downlink (DL) and the uplink (UL).

Further, a plurality of PUCCH formats may be defined in the short PUCCH and the long PUCCH (e.g., according to the maximum number of UEs which may be multiplexed or a channel coding scheme) and the size of the payload which may be transmitted may be changed for each PUCCH format.

As mentioned above, the LTE(-A) system supports aperiodic CSI reporting and periodic CSI reporting and the CSI reporting is performed through each of the PUSCH and the PUCCH.

Semi-persistent CSI reporting corresponds to a CSI reporting scheme which is not supported in the LTE(-A) system.

Accordingly, the present disclosure provides a method indicating through which uplink (UL) resource the CSI reporting is to be performed when the semi-persistent (SP) CSI reporting is supported.

Semi-Persistent CSI Reporting on PUSCH

First, a method for performing the semi-persistent CSI reporting on the PUSCH will be described.

Such a method is characterized in that the UE is operated by linking semi-persistent PUSCH resource allocation information (similar to semi-persistent scheduling (SPS) in the LTE system) with CSI reporting activation.

That is, when the UE receives a CSI reporting activation message, the UE starts CSI reporting to the eNB through the designated PUSCH resource in advance or through SPS information transferred together with the CSI reporting activation message.

The CSI reporting activation may be indicated through an L1 (e.g., DCI) message or an L2 (e.g., MAC CE) message.

In addition, the SPS information may be transferred as L1 (e.g., DCI), L2 (e.g., MAC CE), or L3 (e.g., RRC) control information.

Further, the SPS information may be constituted by a temporal characteristic (e.g., a period or a slot offset) of the PUSCH resource, a frequency characteristic (e.g., PRB indexes), a code characteristic (e.g., sequence), and/or a spatial characteristic (e.g., DMRS port).

Some or all of the SPS information may be configured or designated earlier than a CSI reporting activation instance (by L1 signaling, L2 signaling, or L3 signaling).

When the SPS information is configured or designated earlier than the CSI reporting activation, the UE may start the CSI reporting through a predesignated SPS resource simultaneously with receiving the CSI reporting activation message.

That is, the CSI reporting activation message may indicate preconfigured PUSCH activation.

When resource information for the SPS is preconfigured by the L2 or L3 signaling, the resource information for the SPS may include period and slot/subframe offset information which is time resource information together in addition to resource allocation (RA) information which is frequency resource scheduling information.

Further, the frequency resource information may additionally include PUSCH hopping pattern information depending on a reporting instance.

The SPS information (e.g., RA) may be designated simultaneously with the CSI reporting activation instance, and when (1) the CSI reporting activation is indicated by L1 (DCI), the SPS information may also be indicted by L1 and when (2) the CSI reporting activation is indicated by L2 (MAC CE), the SPS information may also be indicated by L2.

In the LTE system, SPS activation/release information for the PUSCH is transferred to the UE by using RNTI (i.e., SPS-C-RNTI) different from RNTI (i.e., C-RNTI) for transferring general one shot DL/UL scheduling information to be configured to be distinguished in a PUCCH decoding step.

In transferring SP reporting activation/deactivation information, whether RNTI (e.g., C-RNTI in LTE) for one shot scheduling is used, whether RNTI (e.g., SPS-C-RNTI in LTE) for PUSCH SPS is used, or a method for assigning separate RNTI may be considered.

When being commonly used with RNTI (e.g., SPS-C-RNTI) for the PUSCH SPS in transferring the SP reporting activation/deactivation information, whether the UL grant is used for the PUSCH SPS, whether the UL grant is used for SP CSI reporting, (or whether the UL grant is used for both the PUSCH SPS and the SP CSI reporting) may be indicated by a 1 (or 2)-bit field.

When the above-described contents are briefly summarized again, the semi-persistent CSI reporting through the PUSCH is supported in the NR. In addition, the SP-CSI through the PUSCH is activated/deactivated by the DCI.

In the method proposed by the present disclosure, RNTI is used which is separated from C-RNTI for the SPS PUSCH for the DCI for indication of activation or deactivation of the SP-CSI through the PUSCH.

One example of the separate RNTI may be expressed by SP-CSI-RNTI.

That is, in the NR system, when both a VoIP service and SP-CSI reporting are used, it may be preferable to use the separate RNTI for each use.

The reason is that using the separate RNTI may reduce a misdetection probability for the DCI of the UE and add a valid bit to the DCI.

Further, the SP CSI reporting through the PUSCH is different from SPS scheduling in LTE used for the purpose of the VoIP service in that the SP CSI reporting may be used for the purpose of controlling interference with a neighboring cell.

In addition, SP CSI transmission through the PUSCH is different from SPS scheduling that does not perform UL transmission when there is no datum to be transmitted in that the CSI is continuously transmitted or reported in the corresponding period with a predetermined period.

Additionally, a method for using RNTI for SP CSI activation/deactivation (release) commonly with RNTI (SPS C-RNTI) for the PUSCH SPS will be described in more detail.

For the purpose of configuring two bits or fields in the transmitted DCI by using the RNTI (SPS C-RNTI) (for the purposes of the VoIP service and the SP CSI reporting) and 1 bit (or one field) may be configured for the purpose of indicating activation or release (or deactivation) for the SPS PUSCH (for carrying UL-SCH for the purpose of the VoIP service) and the other 1 bit (or one field) may be configured for the purpose of indicating activation or release for the SPS PUSCH for transmitting a CSI report.

Therefore, activation or release (or deactivation) may be indicated for only one or both of the two SPS PUSCHs by using one UL grant.

In addition, when a method for performing the SP-CSI reporting is supported by using both (one shot) PUSCH and PUCCH to be described below, CSI reporting triggering (or activation) may be indicated by C-RNTI for allocating one shot PUSCH.

Therefore, a CSI reporting scheme using a multi-shot (SPS) PUSCH through the RNTI or a scheme of performing the CSI reporting by using the PUCCH together with one shot PUSCH may be configured to be implicitly distinguished.

The PUSCH SPS may be utilized even for always UL data transmission such as the VoIP service as in the LTE system in addition to the purpose of the SP CSI reporting.

On such a viewpoint, the allocated PUSCH SPS may be utilized for both the SP CSI reporting and the UL data transmission.

In this case, when a data buffer is empty at the CSI reporting instance, only the CSI may be transmitted through the SPS CSI PUSCH and when another UL grant does not exist while there is the data, data transmission to the SPS CSI PUSCH may be performed.

In this case, whether the data and the CSI are simultaneously transmitted may be indicated (by an independent field) in the CSI report (payload).

Alternatively, the data and CSI reporting information may be distinguished by different time, frequencies, codes, and/or spatial resources in the allocated SPS PUSCH resource.

For example, the data and the CSI reporting information may be distinguished through a DMRS sequence, a DMRS port(s), a scrambling sequence, etc.

Semi-Persistent CSI Reporting on PUCCH

Next, a method for performing the SP CSI reporting through the PUCCH will be described.

That is, the corresponding method refers to a method for turning on or off the CSI reporting to a (PUCCH resource selecting and selected) PUCCH in CSI reporting activation for one or a plurality of PUCCH resources which is RRC-configured.

In this case, information for designating whether to perform the CSI reporting by using a specific PUCCH resource may be transmitted together with the CSI reporting activation message or in advance.

The PUCCH resource may include a time, a frequency, a code (sequence), and/or a spatial resource of the PUCCH.

The spatial resource may be, for example, a PUCCH DMRS port indicator, etc.

A PUCCH resource release operation may be defined together with or separately from the CSI reporting deactivation.

For example, an operation may be defined in which a plurality of PUCCH resources which is configured by the RRC is automatically reconfigured by releasing a specific PUCCH resource.

The PUCCH resource release indication may be signaled together with or separately from a reporting deactivation indication.

When the PUCCH resource release indication is signaled separately from the CSI reporting deactivation indication, the CSI reporting is deactivated, but when there is a possibility that the CSI reporting will be re-activated through the same PUCCH resource, the PUCCH resource release may not be indicated.

The semi-persistent reporting using the PUCCH may be limitedly applied to a specific PUCCH type (e.g., long PUCCH) or a specific PUCCH configuration (short PUCCH or long PUCCH, and specific PUCCH format(s) which are more than X symbols and/or Y PRBs) by considering a UCI payload size.

Semi-Persistent CSI Reporting on PUCCH and PUSCH

Next, an SP-CSI reporting method through the PUCCH and the PUSCH mentioned for a moment will be described in detail.

That is, the corresponding method refers to a scheme of supporting the SP CSI reporting by using both the PUSCH and the PUCCH.

For example, when the eNB transmits UL resource allocation information to the UE together with the CSI reporting activation message (which may include PUCCH resource selection information), the UE may perform first CSI reporting through the allocated PUSCH resource and then the CSI reporting may be performed through the configured (or selected) PUCCH resource.

As another example, when the allocated SPS PUSCH resource does not exist any longer while which is allocated while the UE performs the semi-persistent CSI reporting through the SPS PUSCH and the UE does not receive the CSI reporting deactivation from the eNB or when the allocated SPS PUSCH resource collides with or overlaps with a more important (UL or DL) resource (e.g., PUSCH with mini-slot (for PUSCH for URLLC), PUCCH), the UE may perform the CSI reporting to the PUCCH instead of the SPS PUSCH in the corresponding slot or collision region.

Further, when both the PUSCH and the PUCCH are used for the SP CSI reporting, high resolution CSI may be reported through the PUSCH and low resolution may be reported to the PUCCH.

Here, the SP CSI reporting through the PUCCH may be configured to have dependency on the CSI information reported through the PUSCH by considering a limit of a PUCCH payload size.

Alternatively, when the SP CSI reporting is performed by using both the PUSCH and the PUCCH, the entire CSI (i.e., the RI, the PMI, the CQI, and together with the CRI as necessary) may be reported through the PUSCH and some CSI (e.g., PMI only, CQI only, or PMI and CQI only) may be reported to the PUCCH.

Similarly, the SP CSI reporting through the PUCCH may be configured to have dependency on the CSI information reported through the PUSCH by considering the limit of the PUCCH payload size.

For example, a PMI codebook subset may be determined which becomes a reference in subsequent PUCCH reporting based on the reported PMI value at the time of reporting the CSI to the PUSCH.

That is, candidate PMIs to be reported to the PUCCH are limited based on the PMI reported in the PUSCH according to a specific rule to reduce the PMI payload size at the time of reporting the PUCCH.

Here, the 'specific rule' may be a rule promised between the eNB and the UE or may allow the eNB to follow a scheme of directly configuring or designating a codebook subset without the specific rule.

For example, only a W2 value may be transmitted at the time of the subsequent PUCCH CSI reporting while maintaining that a W1 value included in the PUSCH CSI reporting is maintained.

When a plurality of W2s should be transmitted for each subband, respective W2s may be sequentially transmitted through contiguous PUCCH transmission.

Similarly, a differential CQI value (a difference value compared with a reference CQI) may be transmitted at the time of reporting the PUCCH based on the CQI value reported to the PUSCH.

The RI value is also similarly configured to transmit the differential RI value in the PUCCH based on the RI value reported to the PUSCH to reduce the payload size of the PUCCH.

The eNB may also designate a CSI parameter to be updated at each reporting instance in the PUCCH based CSI transmission.

Alternatively, the UE may directly determine the CSI parameter to be updated and report which CSI parameter is updated together with the CSI.

In this case, since update of the CRI, the RI, etc., influences the entire CSI, the update may not be appropriate as partial CSI update.

When the UE updates partial CSI through the PUCCH, CSI (e.g., CRI, RI) other than partial CSI update target may be calculated by assuming a value of most recently reported PUSCH CSI.

For example, when the CQI and the PMI (e.g., W2 only) are updated, the CRI, the RI, and the W1 are calculated by assuming a value reported through a most recent PUSCH.

In such a method, it is assumed that both the PUCCH and the PUSCH are used for one semi-persistent CSI reporting, but such a method may be extensively applied as a scheme of using both the PUCCH and the PUSCH for a plurality of independent aperiodic CSI reporting/SP CSI reporting.

For example, in the case of a UE which completes transmission of high resolution CSI information to the PUSCH (or contiguous PUCCH), the eNB may indicate PUCCH based aperiodic CSI/SP CSI reporting through a separate indication.

In this case, the CSI value transmitted through the PUCCH has a dependency on the CSI value reported in the PUSCH as described above to achieve efficient CSI reporting even with a small payload size.

In this case, at the time of indicating the PUCCH based CSI reporting, PUSCH CSI reporting which becomes the reference may be dynamically indicated through the L1 or L2 signaling or configured semi-statically through L3 (RRC) signaling.

When the PUSCH CSI reporting which becomes the reference is configured semi-statically through the L3 signaling, PUCCH based CSI reporting and PUSCH based CSI reporting may be included in one reporting setting or each included in independent reporting setting.

In this case, in order to notify that there is dependency in calculating and reporting the CSI, the eNB may notify to the UE that there is an association between reporting settings or between links included in measurement setting through a separate indicator.

When an error occurs in PUSCH decoding with respect to an operation of updating the CSI with the PUCCH after first transmitting the CSI report to the PUSCH, there may be a problem in that subsequent PUCCH based CSI reporting information may also be understood (or interpreted) differently.

In order to solve the problem, when an operation is defined in which the eNB sends ACK/NACK to initial PUSCH transmission (e.g., #n-th slot) (e.g., #(n+k) slot), if the ACK is received by the UE at an instant of #(n+k), the UE may continuously perform PUCCH transmission which is normally proposed.

However, when NACK is received by the UE at the instance of #(n+k), the UE may perform retransmission with respect to the initial PUSCH transmission according to a previously defined or configured timeline again and repeat such an operation again.

In this case, the maximum number of re-transmissions which are possible with respect to the PUSCH transmission may be defined or configured.

When an operation is not defined (or supported or configured) in which the eNB sends the ACK or NACK with respect to initial PUSCH transmission (e.g., #n-th slot), the UE (assumes that the eNB normally receives the ACK or the NACK) and initiates the subsequent PUCCH transmission.

However, when the UE receives, from the eNB, a UL grant indicating the PUSCH retransmission in the meantime (e.g., within a specific pre-defined or configured time interval after an initial PUSCH), the UE may initialize all association operations (e.g., stop and newly start all transmitted PUCCHs) to performing the PUSCH retransmission.

Thus, as a method for recognizing whether the UL grant is 'UL grant indicating retransmission', it may be recognized that retransmission is indicated when the HARQ ID in the UL grant is the same, it may be recognized that retransmission is indicated whether to indicate the same reporting setting, or it may be recognized that retransmission is indicated by whether toggling is performed because a new data indicator field is included in the DCI similarly to the LTE system.

Additionally, for an operation of performing the CSI reporting by using both the PUSCH and the PUCCH, PUSCH resource allocation information, PUSCH resource allocation/selection information, and reporting activation information may be signaled from the eNB to the UE together or separately.

For example, the reporting activation and the PUCCH allocation/selection information may be together transmitted (through the MAC CE) and the PUSCH resource allocation information may be separately transmitted by the DCI.

In this case, when the UE is allocated the PUSCH resource without performing the CSI reporting until receiving the DCI for the PUSCH resource allocation from the eNB, the UE may perform the subsequent CSI reporting through the PUCCH resource after performing first CSI reporting through the PUSCH.

Alternatively, (2) the UE may start performing the CSI reporting through the (selected) PUCCH resource regardless of an instance of receiving PUSCH resource allocation information. In the case of (2), when the UE receives, from the eNB, the PUSCH resource allocation for the CSI reporting at any instance, PUCCH based CSI reporting information performed after the PUSCH based CSI reporting may have the dependency on the PUSCH based CSI reporting information.

In addition, the PUCCH based CSI reporting information performed before the PUSCH based CSI reporting may have no dependency on the PUSCH based CSI reporting information.

The PUCCH resource disclosed in the present disclosure is collective referred to as a PUCCH time, frequency, code, and/or spatial resource.

Further, the PUCCH resource may be configured differently for each instance. For example, PUCCH resource information allocated at different instances may be configured or indicated in the form of the sequence.

It may be more preferable that candidate PUCCH resource information is configured as RRC information and through which PUCCH resource the indicated CSI reporting is performed may be more dynamically indicated through Medium Access Control (MAC) Control Element (CE) and/or DCI.

UL Resource Indication for Semi-Persistent/Aperiodic Reporting

In applying the proposed schemes described above, the (NR) system may support both the PUCCH based SP reporting the PUSCH based SP reporting and the eNB may select or configure which UL resource the SP CSI reporting is to be performed by using.

When the UL resource designation is configured by the RRC semi-statically, the UL resource designation may be included in the parameter of the reporting setting.

Alternatively, a method for more dynamically configuring the UL resource designation by the L1 signaling or L2 signaling may also be possible.

In this case, a plurality of candidate UL resources may be previously RRC-configured in a plurality of reporting settings or a single reporting setting.

The plurality of (candidate) UL resources may be included in one or a plurality of PUCCH resources and/or one or a plurality of PUSCH resources.

Among them, the eNB may be explicitly or implicitly designate through which UL resource the CSI reporting is to be performed through the L1 and/or L2 signaling.

As one example of implicit indication, (CSI) reporting may be performed to the PUCCH at the time of activation with DL DCI and designated to be reported to the PUSCH at the time of activation with UL DCI.

In a latter case (reporting to the PUSCH), subsequent (CSI) reporting may be performed by using the PUCCH.

As another example of the implicit indication, a plurality of PUCCH resources having different reporting timing attributes is configured by the RRC (e.g., different slot offset with same/integer-multiple period), which PUCCH resource is to be used may be indicated through indication of the reporting timing.

As yet another example of the implicit indication, when DCI based SP CSI reporting is introduced (for contiguous CSI reporting at a predetermined number of times) and MAC CE based SP CSI reporting is also introduced (for persistent CSI reporting until the eNB is deactivated), it may be more preferable that the DCI based SP CSI reporting is performed by the PUSCH and the MAC CE based SP CSI reporting is performed by the PUCCH.

In this case, when the SP CSI reporting is indicated by the DCI, a resource allocation (RA) field for the PUSCH may be together transmitted.

In addition, when a mechanism of a type which is automatically stopped after performing the CSI reporting at a predetermined number of times is defined, a risk in DCI misdetection is weakened, and as a result, DCI may be advantageous, which may more rapidly activate the CSI reporting.

Contrary to this, in the case of an SP CSI reporting mechanism which is persistently maintained until receiving the (CSI reporting) deactivation indication, the CSI reporting is not deactivated at the time of the DCI misdetection, and as a result, serious interference and power consumption of the UE may be caused. Therefore, it may be more preferable to perform deactivation by the MAC CE.

In such a case, it may be implicitly transferred whether the UE is to use the PUCCH or whether the UE is to perform the SP CSI reporting by using the PUSCH according to a container for transferring the activation/deactivation message is the DCI or the MAC CE.

The L1/L2 explicit/implicit indication may be indicated together with or separately from the CSI reporting activation message.

As a separately indicated example, the UL resource may be previously selected by the Layer 1 (L1) and/or Layer 2 (L2) signaling and then CSI reporting activation through the corresponding (or selected) UL resource may be indicated by subsequent L1 and/or L2 signaling.

The semi-static/dynamic UL resource selecting scheme may be applied even to the aperiodic CSI reporting in addition to the semi-persistent CSI reporting.

For example, one or a plurality of PUCCH resources and/or one or a plurality of PUSCH resources may be RRC-configured for the aperiodic CSI reporting and then a final UL resource that is to perform the aperiodic CSI reporting may be designated through L1 and/or L2 implicit or explicit indication.

CSI Reporting Activation/Deactivation Timing

The PUSCH resource or PUCCH resource may be deactivated together at the time of semi-persistent reporting deactivation.

In this case, with respect to the deactivation instance, (1) the CSI report is not sent after the corresponding slot, (2) all remaining CSI feedback parameters are transmitted and then the CSI reporting is stopped, or (3) the eNB may stop the CSI reporting after a configured (or designated) instance.

In the case of (2), CSI feedback information may be sequentially split and transmitted through various reporting instances due to a limit in payload size as in the LTE at the time of the CSI reporting through the PUCCH.

In this case, when the UE receives, from the eNB, the reporting deactivation message in the middle of the reporting, the occupied PUSCH resource or PUCCH resource may be maintained until the remaining information is completely sent.

Alternatively, when the UE receives the reporting deactivation message by the MAC CE, the UE may stop the reporting based on a slot which returns the ACK for the PDSCH for transmitting the MAC CE.

Alternatively, even though the UE receives the reporting deactivation message by the DCI, the ACK/NACK for the PDCCH may be defined.

Even in this case, the (CSI) reporting may be stopped based on the slot which returns the ACK.

In this case, even though the UE receives the reporting deactivation message in an n-th slot, the CSI reporting may be maintained until an n+k-th slot which is an ACK return instance.

Even in regard to the CSI reporting start instance, the CSI reporting may be initialized after an instance determined based on a slot instance of receiving reporting activation DCI (or reporting activation MAC CE) (or configured by the eNB) or the reporting may be initialized after an instance determined based on a slot instance of transmitting the ACK for the reporting activation DCI (or reporting activation MAC CE) (or configured by the eNB).

PUCCH/PUSCH Resource (Amount) Allocation for SP CSI Reporting

Next, a PUCCH or PUSCH resource allocating method for the SP CSI reporting will be described.

CSI reporting information may be separately transmitted several times due to the limit in payload size which may be transmitted at once at the time of the SP CSI reporting.

For example, there may be CSI reporting on the PUCCH in the LTE or hybrid CSI feedback in Rel. 14 LTE.

In this case, the CSI payload size to be sent at each reporting instance may vary.

To this end, (1) a method of using only one PUSCH/PUCCH format supporting the same maximum payload size every CSI reporting instance and (2) a method of using a plurality of different PUCCH/PUSCH formats supporting different max payload sizes every CSI reporting instance may be considered.

In the case of (1), a UL power control mechanism may be defined, in which since a UCI code rate may vary every CSI reporting instance, when a high code rate is used, power boosting is performed and when a low code rate is used, power de-boosting is performed.

Further, in the case of (2), an operation of the eNB which semi-statically/dynamically configures or designates the reporting instance and the type of PUSCH/PUCCH format to be used may be required.

Alternatively, a PUSCH/PUCCH format change pattern may be defined which is promised on the time according to a CSI feedback information configuration (e.g., CSI reporting mode in LTE).

Similarly to the LTE PUCCH, CSI feedback parameters need to be subdivided into multiple groups and respective CSI parameter groups may be sequentially transmitted through different PUCCH transmission instances due to the limit in CSI payload size on each PUCCH.

In the NR PUCCH, since consistency for the number of PUCCH symbols may not be guaranteed due to a flexible TDD operation, the PUCCH resource available for each CSI reporting instance may not be consistent.

Accordingly, in the case of CSI reporting for the PUCCH having fragmented CSI parameters, unequal grouping of the CSI parameters may be preferable in terms of the CSI payload size.

Hereinafter, a matter related to a PUCCH design for CSI reporting and beam management will be described in brief.

A research into multi-beam based NR-PUCCH transmission for robustness for beam pair link blocking is performed.

For example, the UE may transmit the NR-PUCCH for different UL Tx beams in different NR-PUCCH OFDM symbols.

A combination of a semi-static configuration (at least for specific types of the UCI information) and dynamic signaling is used for determining both the PUCCH resources for the 'long PUCCH format and short PUCCH format'.

Two NR-PUCCHs may be transmitted from one UE on the same slot by the TDM scheme.

Two NR-PUCCHs may be short PUCCHs.

Two NR-PUCCHs may be short PUCCH and short PUCCH.

PUCCH resources for different time domain behaviors of CSI reporting

In the LTE, since the maximum UCI payload size which is supportable in the PUCCH is fixed and the CSI reporting is very limited, the CSI reporting for the PUCCH is supported only for light-weight CSI feedback.

The CSI feedback information is split into various portions due to the limit in PUCCH payload size and sequentially transmitted to multiple PUCCHs in different subframes.

In addition, heavy and aperiodic CSI reporting is supported only in the PUSCH.

However, in the NR, the UCI payload size which is supportable on the PUCCH may be very wide according to a PUCCH type (i.e., PUCCH in long-duration or PUCCH in short-duration) and the number of PUCCH symbols (or PUCCH duration).

The maximum UCI payload size which is supportable in the PUCCH may significantly increase to several hundreds of bits in the case of the PUCCH (or long PUCCH) in the long-duration.

Accordingly, in the NR, wider and more flexible using the PUCCH may be considered for the CSI reporting.

As described above, in the NR, three time domain operations (aperiodic, semi-static (or semi-permanent or semi-persistent), and periodic CSI reporting) of the CSI reporting are supported.

The PUCCH may be used for periodic and semi-static CSI reporting similarly to the LTE.

However, in the case of the NR, the payload size of the CSI feedback which is maximally supportable per CSI reporting instance is dynamic and it is almost impossible to maintain consistency for a flexible TDD slot configuration.

It is more preferable to permit different PUCCH formats/duration every CSI reporting instance according to the CSI payload size in order to avoid excessive CSI fragmentation and reporting delay.

In this regard, as described above, commonly using the PUSCH and the PUCCH for the CSI reporting may also be considered.

For example, when the PUSCH is first used for the entire CSI feedback, the CSI feedback may be updated by using the PUCCH in the case of the semi-static CSI reporting.

A PUCCH format/duration which is not matched per CSI reporting instance for the semi-static/periodic CSI reporting is considered.

The aperiodic CSI reporting is supported only through the PUSCH in the LTE, but the aperiodic CSI reporting for the PUCCH may be considered in the NR.

One of main motivations using the PUCCH for the aperiodic CSI reporting may be, for example, immediate and fast CSI reporting in the slot.

The corresponding PUCCH for CSI triggering DCI, CSI-RS, and CSI reporting may exist in the same slot.

In this regard, the short PUCCH may be positioned at the end of the slot and since a maximum of two symbols are occupied, the PUCCH (or short PUCCH) in the short duration may become an appropriate candidate similarly to fast ACK/NACK reporting.

Such a function may be supported only for very light CSI feedback by considering only a CSI calculation time.

Further, the aperiodic CSI reporting may be considered on the short PUCCH for quick and very light CSI feedback.

Figure 11:
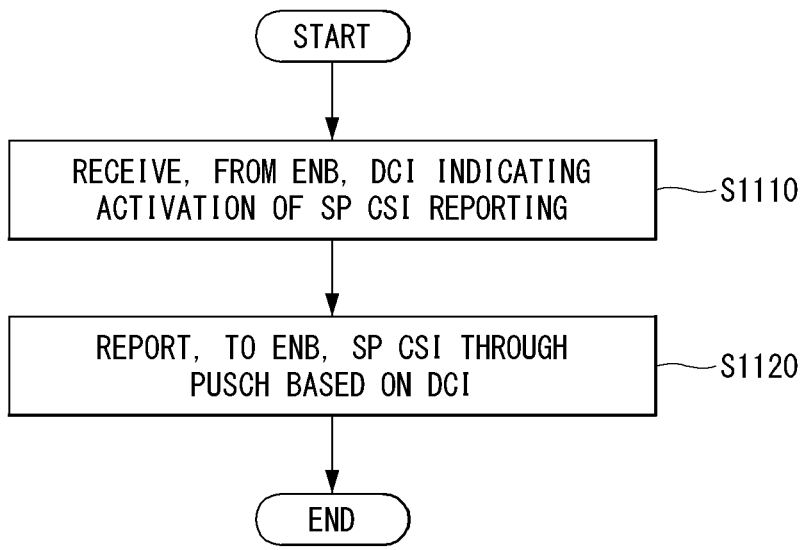
FIG. 11 is a flow chart illustrating an example of a UE operation performing CSI reporting proposed by the present specification.

FIG. 11 is a flowchart illustrating one example of an operation method of a UE that performs SP CSI reporting proposed by the present disclosure.

First, the UE receives, from the eNB, downlink control information (DCI) indicating activation of semi-persistent (SP) CSI reporting (S1110).

Here, the uplink control information may be scrambled with a specific RNTI distinguished from a Cell-Radio Network Temporary Identity (C-RNTI).

Here, an advantage of using the RNTI separated from the C-RNTI is that a misdetection for the DCI of the UE may be reduced and the valid bit may be added to the DCI.

Thereafter, the UE reports to the eNB the semi-persistent CSI through the physical uplink shared channel (PUSCH) based on the received downlink control information (S1120).

Here, the SP CSI reporting may include first SP CSI reporting and second SP CSI reporting.

As one example, when the quantity of SP CSI reports is large, the SP CSI report may be separately transmitted several times and the second SP CSI reporting may be performed after the first SP CSI reporting.

Further, the UE may receive, from the eNB, the PUSCH resource to report the SP CSI before or after performing S1110.

Here, when the PUSCH resource collides with a specific uplink resource, the SP CSI may be reported to the eNB through the physical uplink control channel (PUCCH).

Specifically, when the PUSCH resource and the PUCCH resource to report the SP CSI collide with each other, the PUSCH resource to report the SP CSI may be dropped and the SP CSI (or by feeding back the SP CSI to the PUCCH) may be reported by using the collided PUCCH resource or a separately configured PUCCH (for the CSI reporting).

Alternatively, when the PUSCH resource (mini-slot or one shot) and the PUSCH resource to report the SP CSI collide with each other, the PUSCH resource may be dropped (or not transmitted) and the SP CSI may be reported by using the collided PUSCH resource (mini-slot or one shot) or a separately configured PUCCH (for the CSI reporting). Here, the mini-slot may mean a slot constituted by symbols of a specific number or less, which may be constituted by 2, 4, or 7 symbols.

In addition, the SP CSI through the PUCCH may be reported in a slot related to the collision.

Further, the UE may determine an uplink resource to perform the SP CSI reporting before performing step S1120.

Specifically, the UE may report the SP CSI through the PUSCH when the DCI is uplink DCI and report the SP CSI through the PUCCH when the DCI is downlink DCI.

The SP CSI reporting through the PUSCH described above is different from SPS scheduling in LTE used for the purpose of the VoIP service in that the SP CSI reporting may be used for the purpose of controlling interference with a neighboring cell.

In addition, SP CSI transmission through the PUSCH is different from SPS scheduling that does not perform UL transmission when there is no datum to be transmitted in that the CSI is continuously transmitted or reported in the corresponding period with a predetermined period.

Overview of Devices to which Present Disclosure is Applicable

Figure 12:
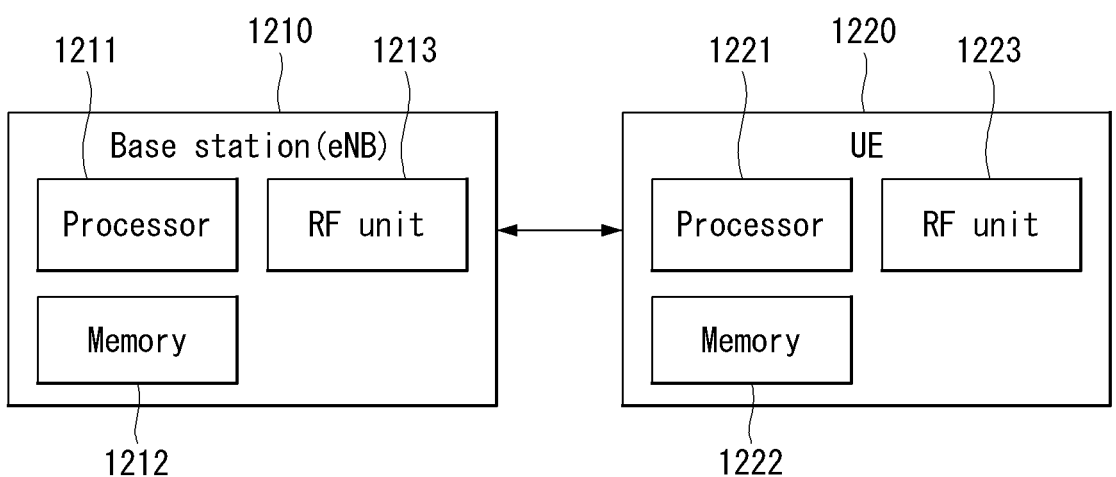
FIG. 12 is a block diagram illustrating a configuration of a wireless communication device according to an embodiment of the present disclosure.

FIG. 12 illustrates a block diagram of a wireless communication apparatus according to an embodiment of the present disclosure.

Referring to FIG. 12, a wireless communication system includes an eNB (or network) 1210 and a UE 1220.

The eNB 1210 includes a processor 1211, a memory 1212, and a communication module 1213.

The processor 1211 implements a function, a process, and/or a method which are proposed in FIGS. 1 to 11 above. Layers of a wired/wireless interface protocol may be implemented by the processor 1211. The memory 1212 is connected with the processor 1211 to store various pieces of information for driving the processor 1211. The communication module 1213 is connected with the processor 1211 to transmit and/or receive a wired/wireless signal.

The communication module 1213 may include a radio frequency (RF) unit for transmitting/receiving a radio signal.

The UE 1220 includes a processor 1221, a memory 1222, and a communication module (or RF unit) 1223. The processor 1221 implements a function, a process, and/or a method which are proposed in FIGS. 1 to 11 above. The layers of the wireless interface protocol may be implemented by the processor 1221. The memory 1222 is connected with the processor 1221 to store various pieces of information for driving the processor 1221. The communication module 1223 is connected with the processor 1221 to transmit and/or receive the wireless signal.

The memories 1212 and 1222 may be positioned inside or outside the processors 1211 and 1221 and connected with the processors 1211 and 1221 by various well-known means.

Further, the base station 1210 and/or the UE 1220 may have a single antenna or multiple antennas.

Figure 13:
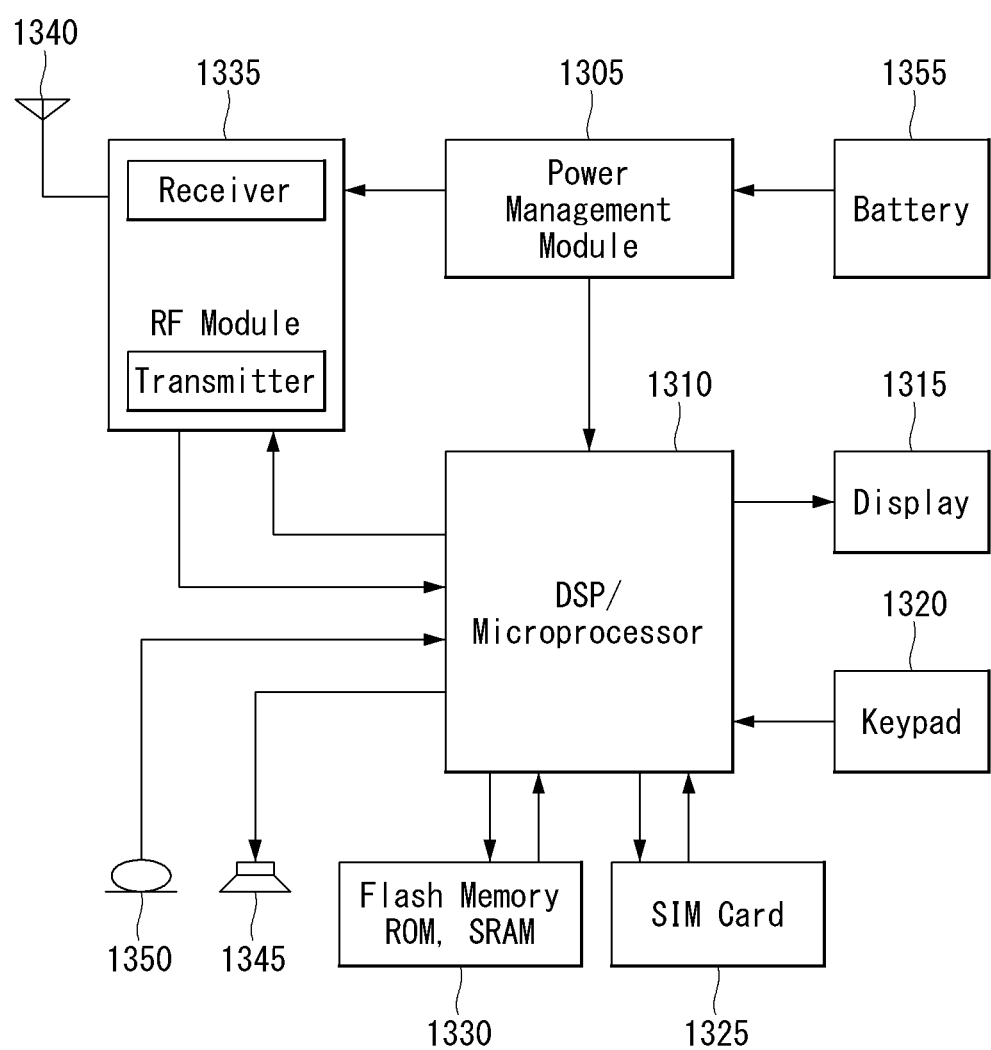
FIG. 13 is a block diagram illustrating a configuration of a communication device according to an embodiment of the present disclosure.

FIG. 13 illustrates a block diagram of a communication device according to an embodiment of the present disclosure.

In particular, FIG. 13 is a diagram more specifically illustrating the UE of FIG. 12 above.

Referring to FIG. 13, the UE may be configured to include a processor (or a digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (this component is optional), a speaker 1345, and a microphone 1350. The UE may also include a single antenna or multiple antennas.

The processor 1310 implements a function, a process, and/or a method which are proposed in FIGS. 1 to 11 above. Layers of a wireless interface protocol may be implemented by the processor 1310.

The memory 1330 is connected with the processor 1310 to store information related to an operation of the processor 1310. The memory 1330 may be positioned inside or outside the processor 1310 and connected with the processor 1310 by various well-known means.

A user inputs command information such as a telephone number or the like by, for example, pressing (or touching) a button on the keypad 1320 or by voice activation using the microphone 1350. The processor 1310 receives such command information and processes to perform appropriate functions including dialing a telephone number. Operational data may be extracted from the SIM card 1325 or the memory 1330. In addition, the processor 1310 may display command information or drive information on the display 1315 for the user to recognize and for convenience.

The RF module 1335 is connected with the processor 1310 to transmit and/or receive an RF signal. The processor 1310 transfers the command information to the RF module 1335 to initiate communication, for example, to transmit wireless signals constituting voice communication data. The RF module 1335 is constituted by a receiver and a transmitter for receiving and transmitting the wireless signals. The antenna 1340 functions to transmit and receive the wireless signals. Upon receiving the wireless signals, the RF module 1335 may transfer the signal for processing by the processor 1310 and convert the signal to a baseband. The processed signal may be converted into to audible or readable information output via the speaker 1345.

Figure 14:
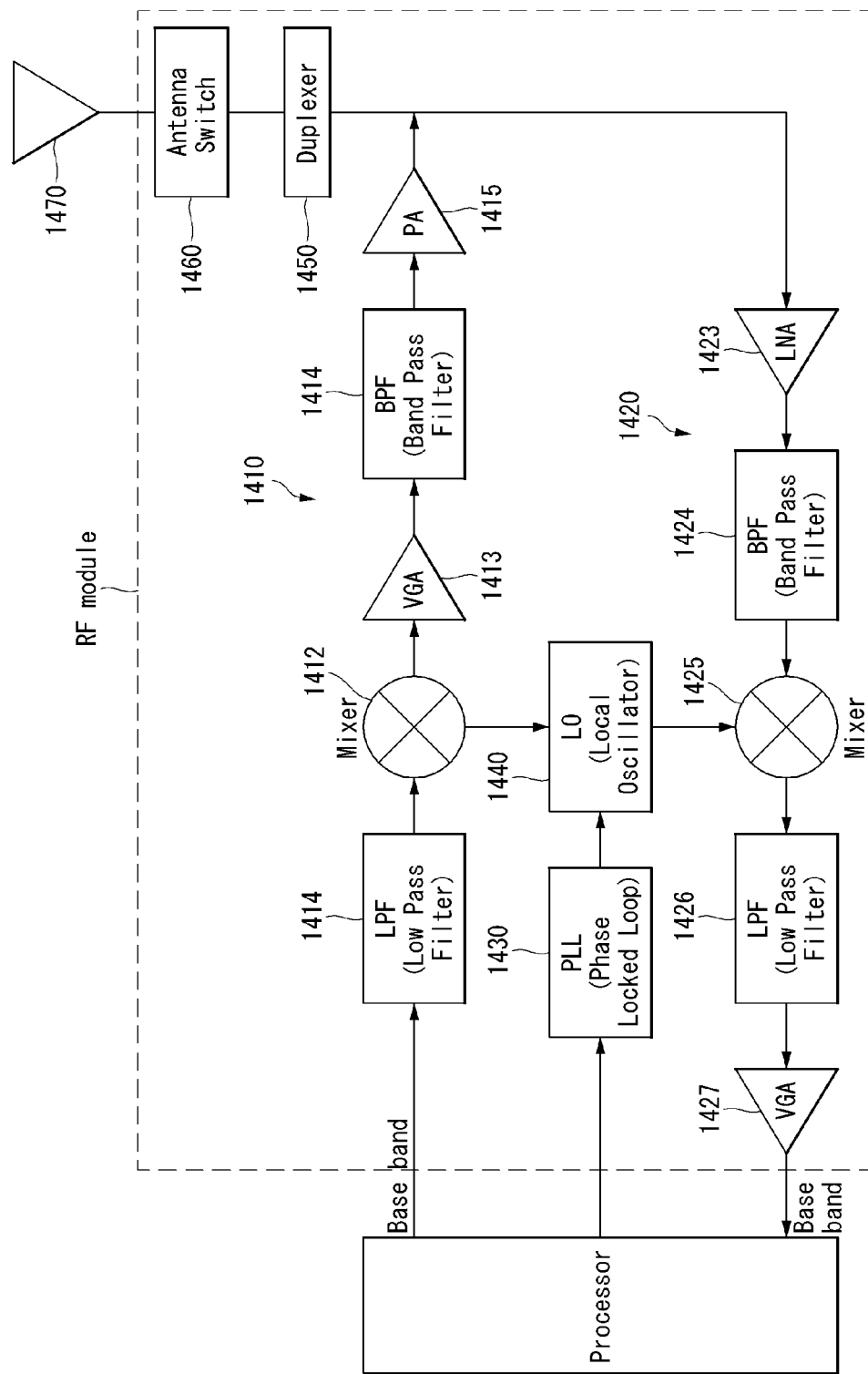
FIG. 14 illustrates an example of a radio frequency (RF) module of a wireless communication device to which a method proposed by the present specification is applicable.

FIG. 14 is a diagram illustrating an example of an RF module of the wireless communication device to which the method proposed in the present specification may be applied.

Specifically, FIG. 14 illustrates an example of an RF module that may be implemented in a frequency division duplex (FDD) system.

First, in a transmission path, the processors described in FIGS. 12 and 13 process the data to be transmitted and provide an analog output signal to the transmitter 1410.

Within the transmitter 1410, the analog output signal is filtered by a low pass filter (LPF) 1411 to remove images caused by a digital-to-analog conversion (ADC) and up-converted to an RF from a baseband by an up-converter (mixer) 1412, and amplified by a variable gain amplifier (VGA) 1413 and the amplified signal is filtered by a filter 1414, additionally amplified by a power amplifier (PA) 1415, routed through a duplexer(s) 1450/an antenna switch(es) 1460, and transmitted through an antenna 1470.

In addition, in a reception path, the antenna 1470 receives signals from the outside and provides the received signals, which are routed through the antenna switch(es) 1460/duplexers 1450 and provided to a receiver 1420.

In the receiver 1420, the received signals are amplified by a low noise amplifier (LNA) 1423, filtered by a bans pass filter 1424, and down-converted from the RF to the baseband by a down-converter (mixer) 1425.

The down-converted signal is filtered by a low pass filter (LPF) 1426 and amplified by a VGA 1427 to obtain an analog input signal, which is provided to the processors described in FIGS. 12 and 13.

Further, a local oscillator (LO) generator 1440 also provides transmitted and received LO signals to the up-converter 1412 and the down-converter 1425, respectively.

In addition, a phase locked loop (PLL) 1430 receives control information from the processor to generate the transmitted and received LO signals at appropriate frequencies and provides control signals to the LO generator 1440.

Further, circuits illustrated in FIG. 14 may be arranged differently from the components illustrated in FIG. 14.

Figure 15:
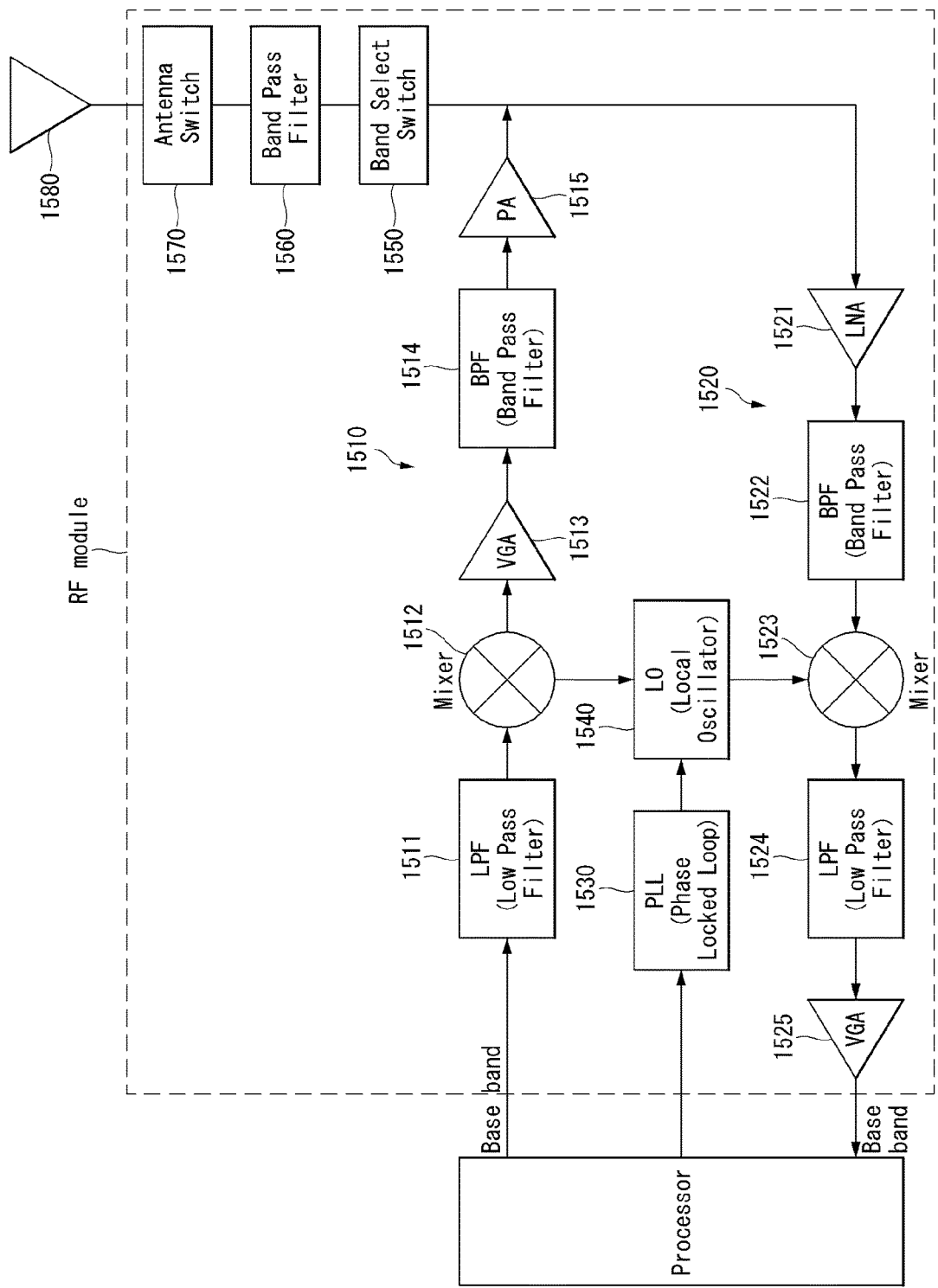
FIG. 15 illustrates another example of an RF module of a wireless communication device to which a method proposed by the present specification is applicable.

FIG. 15 is a diagram illustrating yet another example of the RF module of the wireless communication device to which a method proposed by present disclosure can be applied.

Specifically, FIG. 15 illustrates an example of an RF module that may be implemented in a time division duplex (TDD) system.

A transmitter 1510 and a receiver 1520 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 14.

A signal amplified by a power amplifier (PA) 1515 of the transmitter is routed through a band select switch 1550, a band pass filter (BPF) 1560, and an antenna switch(es) 1570 and transmitted via an antenna 1580.

In addition, in a reception path, the antenna 1580 receives signals from the outside and provides the received signals, which are routed through the antenna switch(es) 1570, the band pass filter 1560, and the band select switch 1550 and provided to the receiver 1520.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

In the wireless communication system of the present disclosure, an example in which the CSI reporting method is applied to the NR system and the 5G system is primarily described, but besides, the CSI reporting method may be applied to various wireless communication systems.

The invention claimed is:

1. A method for receiving, by a base station, channel state information (CSI) in a wireless communication system, the method comprising:
transmitting, to a user equipment (UE), CSI reporting configuration via a Radio Resource Control (RRC) signaling, the CSI reporting configuration comprising information for a time domain CSI reporting behavior configured as semi-persistent (SP);
transmitting, to the UE, a specific message related to an activation of SP CSI reporting; and
receiving, from the UE, an SP CSI report based on the time domain CSI reporting behavior configured as SP in the CSI reporting configuration,
wherein based on the specific message being downlink control information (DCI) that activates the SP CSI reporting, the SP CSI report is received from the UE on a physical uplink shared channel (PUSCH), and wherein based on the specific message being a medium access control (MAC) control element (CE) that activates the SP CSI reporting, the SP CSI report is received from the UE on a physical uplink control channel (PUCCH).

2. The method of claim 1, wherein the SP CSI reporting includes a first SP CSI reporting and a second SP CSI reporting.

3. The method of claim 1, further comprising:
based on the specific message being the DCI that activates the SP CSI reporting:
transmitting, to the UE, resource configuration information related to scheduling a PUSCH resource for transmitting the SP CSI report.

4. The method of claim 3, wherein based on the specific message being the DCI that activates the SP CSI reporting:
based on a collision between the PUSCH resource and a specific uplink resource, the SP CSI report is received from the UE through the PUCCH.

5. The method of claim 4, wherein the specific uplink resource is another PUCCH resource or another PUSCH resource on a mini-slot.

6. The method of claim 4, wherein the SP CSI report is received through the PUCCH in a slot which is related to the collision between the PUSCH resource and the specific uplink resource.

7. The method of claim 1, wherein based on the specific message being the DCI that activates the SP CSI reporting:
the DCI is scrambled with a specific radio network temporary identity (RNTI) which is distinct from a cell-radio network temporary identity (C-RNTI).

8. A base station configured to receive channel state information (CSI) in a wireless communication system, the base station comprising:
a transceiver; and
at least one processor; and
at least one computer memory operably connected to the at least one processor and storing instructions that, based on being executed by the at least one processor, perform operations comprising:
transmitting, to a user equipment (UE) through the transceiver, CSI reporting configuration via a Radio Resource Control (RRC) signaling, the CSI reporting configuration comprising information for a time domain CSI reporting behavior configured as semi-persistent (SP);
transmitting, to the UE through the transceiver, a specific message related to an activation of SP CSI reporting; and
receiving, from the UE through the transceiver, an SP CSI report based on the time domain CSI reporting behavior configured as SP in the CSI reporting configuration,
wherein based on the specific message being downlink control information (DCI) that activates the SP CSI reporting, the SP CSI report is received from the UE on a physical uplink shared channel (PUSCH), and
wherein based on the specific message being a medium access control (MAC) control element (CE) that activates the SP CSI reporting, the SP CSI report is received from the UE on a physical uplink control channel (PUCCH).

9. The base station of claim 8, wherein the SP CSI reporting includes a first SP CSI reporting and a second SP CSI reporting.

10. The base station of claim 8, wherein the operations further comprise:
based on the specific message being the DCI that activates the SP CSI reporting:
transmitting, to the UE through the transceiver, resource configuration information related to scheduling a PUSCH resource for transmitting the SP CSI report.

11. The base station of claim 10, wherein based on the specific message being the DCI that activates the SP CSI reporting:
based on a collision between the PUSCH resource and a specific uplink resource, the SP CSI report is received from the UE through the PUCCH.

12. The base station of claim 11, wherein the specific uplink resource is another PUCCH resource or another PUSCH resource on a mini-slot.

13. The base station of claim 11, wherein the SP CSI report is received through the PUCCH in a slot which is related to the collision between the PUSCH resource and the specific uplink resource.

14. The base station of claim 8, wherein based on the specific message being the DCI that activates the SP CSI reporting:
the DCI is scrambled with a specific radio network temporary identity (RNTI) which is distinct from a cell-radio network temporary identity (C-RNTI).

15. At least one non-transitory computer-readable media storing instructions that, based on being executed by at least one processor, perform operations comprising:
receiving, from a base station, CSI reporting configuration via a Radio Resource Control (RRC) signaling, the CSI reporting configuration comprising information for a time domain CSI reporting behavior configured as semi-persistent (SP);
receiving, from the base station, a specific message related to an activation of SP CSI reporting; and
transmitting, to the base station, an SP CSI report based on the time domain CSI reporting behavior configured as SP in the CSI reporting configuration,
wherein based on the specific message being downlink control information (DCI) that activates the SP CSI reporting, the SP CSI report is transmitted to the base station on a physical uplink shared channel (PUSCH), and
wherein based on the specific message being a medium access control (MAC) control element (CE) that activates the SP CSI reporting, the SP CSI report is transmitted to the base station on a physical uplink control channel (PUCCH).

16. The at least one non-transitory computer-readable media of claim 15, wherein the SP CSI reporting includes a first SP CSI reporting and a second SP CSI reporting.

17. The at least one non-transitory computer-readable media of claim 15, further comprising:
based on the specific message being the DCI that activates the SP CSI reporting:
receiving, from the base station, resource configuration information related to scheduling a PUSCH resource for transmitting the SP CSI report.

18. The at least one non-transitory computer-readable media of claim 17, wherein based on the specific message being the DCI that activates the SP CSI reporting:
based on a collision between the PUSCH resource and a specific uplink resource, the SP CSI report is transmitted to the base station through the PUCCH.

19. The at least one non-transitory computer-readable media of claim 18, wherein the specific uplink resource is another PUCCH resource or another PUSCH resource on a mini-slot.

20. The at least one non-transitory computer-readable media of claim 15, wherein based on the specific message being the DCI that activates the SP CSI reporting:
   the DCI is scrambled with a specific radio network temporary identity (RNTI) which is distinct from a cell-radio network temporary identity (C-RNTI).

* * * * *